United States Patent
Zhu

(10) Patent No.: US 11,055,111 B2
(45) Date of Patent: Jul. 6, 2021

(54) ELECTRONIC DEVICES AND CORRESPONDING METHODS FOR CHANGING OPERATING MODES IN RESPONSE TO USER INPUT

(71) Applicant: Motorola Mobility LLC, Chicago, IL (US)

(72) Inventor: Xiaofeng Zhu, Nanjing (CN)

(73) Assignee: Motorola Mobility LLC, Chicago, IL (US)

( * ) Notice: Subject to any disclaimer, the term of this patent is extended or adjusted under 35 U.S.C. 154(b) by 160 days.

(21) Appl. No.: 16/516,906

(22) Filed: Jul. 19, 2019

(65) Prior Publication Data

US 2020/0401416 A1 Dec. 24, 2020

(30) Foreign Application Priority Data

Jun. 20, 2019 (CN) .......................... 201910536647.9

(51) Int. Cl.
*G06F 9/445* (2018.01)
*G06F 3/01* (2006.01)

(52) U.S. Cl.
CPC .......... *G06F 9/44505* (2013.01); *G06F 3/017* (2013.01)

(58) Field of Classification Search
CPC .............................. G06F 9/44505; G06F 3/017
See application file for complete search history.

(56) References Cited

U.S. PATENT DOCUMENTS

| | | | | |
|---|---|---|---|---|
| 2010/0269040 A1* | 10/2010 | Lee | ...................... | G06F 3/04883 715/702 |
| 2013/0326421 A1* | 12/2013 | Jo | ........................ | G06F 3/04883 715/841 |
| 2014/0137049 A1* | 5/2014 | Jung | ........................ | G06F 21/31 715/847 |
| 2014/0283112 A1* | 9/2014 | Wang | ...................... | G06F 21/36 726/27 |
| 2015/0047014 A1* | 2/2015 | Yoon | ...................... | G06F 3/0481 726/16 |
| 2015/0123910 A1* | 5/2015 | Jaske | ..................... | G06F 3/0488 345/173 |
| 2015/0186017 A1* | 7/2015 | Lee | ........................ | H04M 1/67 715/771 |
| 2015/0205425 A1* | 7/2015 | Kuscher | ................ | G06F 3/0482 345/173 |
| 2016/0026219 A1* | 1/2016 | Kim | ....................... | G06F 1/1652 345/173 |
| 2018/0136833 A1* | 5/2018 | Perkins | ................. | G06F 3/0481 |

(Continued)

OTHER PUBLICATIONS

Olwal, et al., "Rubbing and Tapping for Precise and Rapid Selection on Touch-Screen Displays", Published at SGICHI Conference on Human Factors in Computing Systems; CHI 2008; Apr. 2008.

*Primary Examiner* — Vincent H Tran
(74) *Attorney, Agent, or Firm* — Philip H. Burrus, IV

(57) ABSTRACT

An electronic device includes a touch sensitive display and one or more processors. The touch sensitive display presents a first user actuation target and a second user actuation target, and detects touch input at the first user actuation target and the second user actuation target, optionally within a predefined time. The one or more processors switch, in response to the touch input, the electronic device from a first mode of operation to a second mode of operation.

20 Claims, 9 Drawing Sheets

(56) References Cited

U.S. PATENT DOCUMENTS

| | | | |
|---|---|---|---|
| 2019/0026012 A1* | 1/2019 | Lee | G06F 3/0481 |
| 2019/0104216 A1* | 4/2019 | Van Hecke | G06F 3/04817 |
| 2019/0152433 A1* | 5/2019 | Cumbo | G06F 3/0416 |
| 2020/0026370 A1* | 1/2020 | Shin | G06F 21/32 |
| 2020/0401267 A1* | 12/2020 | Hosaka | G06F 3/041 |

* cited by examiner

ELECTRONIC DEVICES AND CORRESPONDING METHODS FOR CHANGING OPERATING MODES IN RESPONSE TO USER INPUT

CROSS REFERENCE TO PRIOR APPLICATIONS

This application claims priority and benefit under 35 U.S.C. § 119 from Chinese Patent Application No. 201910536647.9, filed Jun. 20, 2019.

BACKGROUND

Technical Field

This disclosure relates generally to electronic devices and corresponding methods, and more particularly to electronic devices and corresponding methods for changing operating modes in response to detected user input.

Background Art

The use of portable electronic devices has become ubiquitous. People use smartphones, tablet computers, gaming devices, and media players throughout the day to communicate with others, stay informed, and for entertainment.

As the technology of these devices has advanced, so too has their feature set. For example, not too long ago most electronic devices had physical keypads. Today touch sensitive displays are more frequently seen as user interface devices. While touch sensitive displays have become more intuitive to use, they are not without issues. To perform setting adjustments and make configuration changes, one typically must navigate through a series of menus and screens in search of a desired setting. It would be advantageous to have an improved electronic device that allowed for operational mode changes in a more efficient manner.

Figure 1:
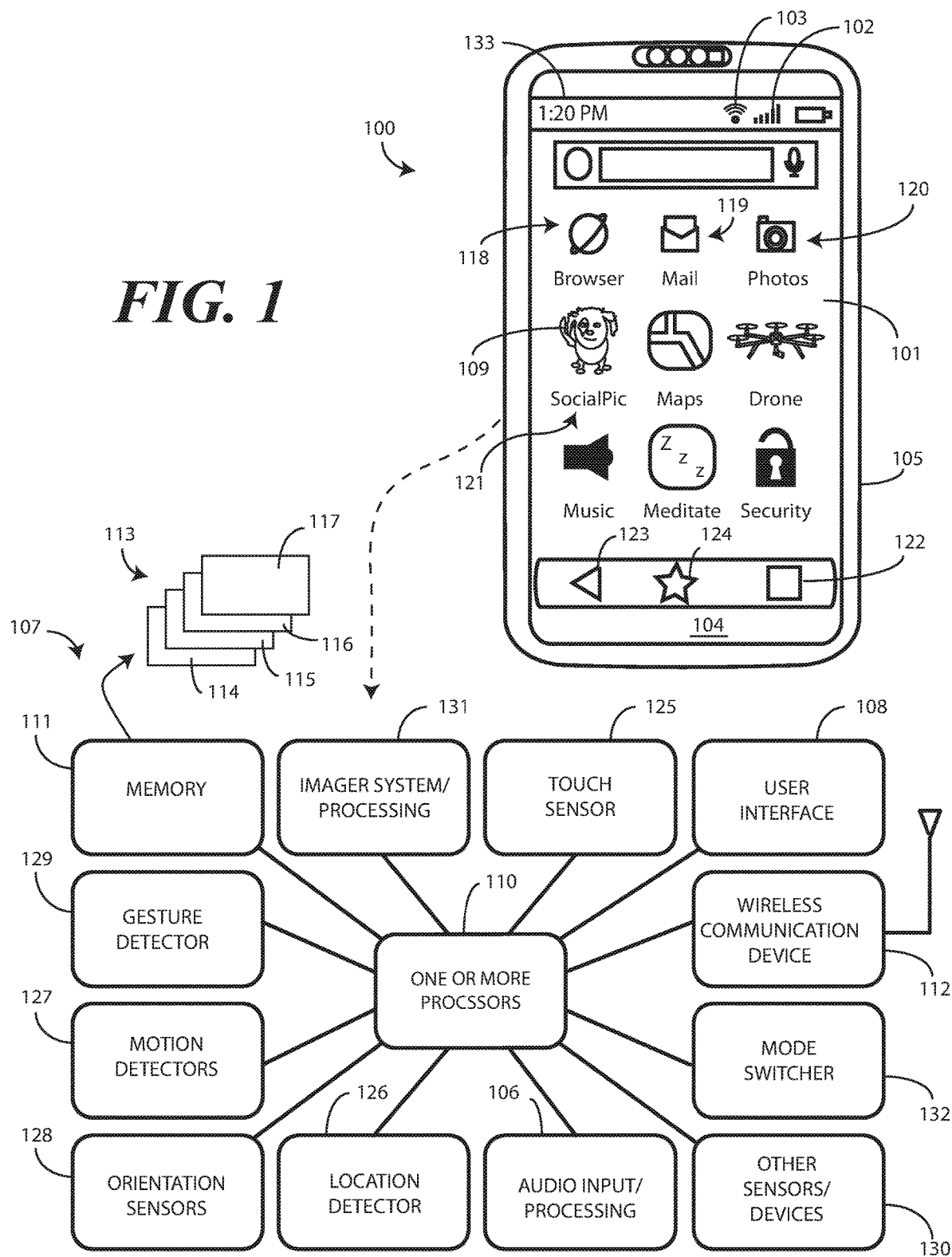
FIG. 1 illustrates one explanatory electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to changing an operating mode of an electronic device from a first mode of operation to a second mode of operation in response to detecting user input interacting with two or more user actuation targets, optionally a plurality of times, within a predefined time period. Any process descriptions or blocks in flow charts should be understood as representing modules, segments, or portions of code that include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of switching an electronic device from a first mode of operation to a second mode of operation in response to touch input occurring at both a first user actuation target and a second user actuation target within a predefined time as described herein. The non-processor circuits may include, but are not limited to, a touch sensitive display, a touch sensor, a touch sensitive surface, a radio receiver, a radio transmitter, signal drivers, clock circuits, power source circuits, and user input devices.

As such, these functions may be interpreted as steps of a method to perform the detection of a user gesture passing a plurality of times over a first user actuation target and a second user actuation target within a predefined time to cause a mode of operation in the electronic device to be altered from a first mode of operation to a second mode of operation. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. As used herein, components may be "operatively coupled" when information can be sent between such components, even though there may be one or more intermediate or intervening components between, or along the connection path.

The terms "substantially", "essentially", "approximately", "about" or any other version thereof, are defined as being close to as understood by one of ordinary skill in the art, and in one non-limiting embodiment the term is defined to be within 10 percent, in another embodiment within 5 percent, in another embodiment within 1 percent and in another embodiment within 0.5 percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure contemplate that users of electronic devices may desire to switch between operating modes "on the fly," meaning that they would like to be able to switch from a first operating mode to a second operating mode without the necessity of navigating many menus, screens, toggle icons, and so forth. Illustrating by example, in many countries of the world electronic communication devices are configured to house and be operable with two different subscriber identity module (SIM) cards, each designed to facilitate communication on a different type of network.

For instance, in China and Brazil, electronic devices using dual-SIM cards are popular because they allow users to communicate on both second-generation (2G) network such as a global system for mobile communications (GSM) network, and also on a fourth generation (4G) network, such as a long term evolution (LTE) network. Such devices are sometimes known as "dual-SIM-dual standby" or "DSDS" devices.

With a DSDS device, a first SIM card facilitates voice and data communication through data links of, for example, the 2G network such as a GSM network, while a second SIM card facilitates voice and data communication through data links of, for example, a LTE network operating as a 4G network. The device connects to both the 2G (GSM) and 4G (LTE) network, with channels, or data links, camping on each network. Accordingly, the user gets accessibility to two networks with a single device. One channel can camp at a high bandwidth cellular network, e.g., the 4G network, while the other channel can camp to the lower bandwidth cellular network, e.g., the 2G network. The user can switch between these channels, with the active channel being presented on a display. Having the ability to optionally connect to either network allows the users of such devices to have more flexibility to use their devices for voice and data communications across available networks, or across different networks as a function of cost.

Embodiments of the disclosure contemplate that a significant problem with not only DSDS devices, but any electronic device capable of operating in more than one operating mode, is that it is frequently difficult to switch from one mode to another. For instance, using a DSDS device as an illustrative example, to switch from the 2G data link to the 4G data link one must navigate several menu items and screens in a settings application to toggle a switch.

Advantageously, embodiments of the disclosure provide methods and systems that allow a user to quickly and easily alter a mode of operation of an electronic device from a first mode of operation to a second mode of operation by delivering a gesture input to a touch sensitive surface, where the gesture input that passes one or more times over a first user actuation target and a second user actuation target. In one or more embodiments, the methods and systems allow the user to alter the mode of operation by delivering the gesture in the form of touch input on the surface of a touch sensitive display, where that touch input interacts with a first user actuation target and a second user actuation target within a predefined time.

In one or more embodiments, the first user actuation target and the second user actuation target are persistently presented on the touch sensitive surface or display so that they are readily available regardless of any application that may be operating on the electronic device. Moreover, in one or more embodiments the first user actuation target and the second user actuation target are persistently presented in a status bar that is continually present on the display across multiple applications. Accordingly, the user can simply and intuitively switch from a first mode of operation to a second mode of operation without terminating a currently operational application in one or more embodiments.

Continuing the DSDS electronic device example, in one or more embodiments one or more processors of the electronic device persistently present a user actuation target, in the form of an interactive graphical object, representing the ability to connect and/or the connection to a 2G network. Simultaneously, the one or more processors persistently present another user actuation target, in the form of another interactive graphical object, representing the ability to connect and/or the connection to a 4G network. In one or more embodiments, these interactive graphical objects are both persistently presented in a status bar rendered on a touch sensitive display of the electronic device.

In one or more embodiments, a user can cause an operating mode of the electronic device to change from a first mode of operation, e.g., communicating via a data link of the 2G network, to a second mode of operation, e.g., communicating via a data link of the 4G network, by delivering user input that interacts with both the first user actuation target and the second user actuation target. In one or more embodiments, this change occurs when the user input interacts with the first user actuation target and the second user actuation target a plurality of times within a predefined time period.

Illustrating by example, the user may use a finger to touch the interactive graphical object representing connections to the 2G network, slide the finger from the graphical object representing connections to the 2G network to the graphical object representing connections to the 4G network, slide the finger back to the graphical object representing connections to the 2G network, and then once again slide the finger back to the graphical object representing connections to the 4G network. In one or more embodiments, in making this motion the finger thereby makes a "Z" shaped motion that sweeps back and forth between the graphical object representing connections to the 2G network and the graphical object representing connections to the 4G network, interacting with each graphical object a plurality of times within a predefined time period such as a second.

In one or more embodiments, when this occurs one or more processors change the operating mode of the electronic device from a first mode of operation, e.g., the active communication link to its associated network, to a second mode of operation, e.g., the inactive communication link to its associated network. Advantageously, by making this simple Z-shaped motion the user can change the wireless connection and network without needing to navigate several menu items and screens in a settings application to toggle a switch.

It should be noted that switching communication links is but one example of how embodiments of the disclosure can be used to change an operating mode of an electronic device from a first mode of operation to a second mode of operation in accordance with embodiments of the disclosure. The methods and systems described herein can be used to quickly and easily change from any number of first modes of operation to any number of second modes of operation simply by interacting with multiple user actuation targets, optionally a plurality of times, within a predefined time period.

Examples of modes embodiments of the disclosure can be used to switch between include from a first application operating on the electronic device to a second application operating on the electronic device, from a data connectivity mode to an "airplane" mode where data connectivity is disabled, from a mode where location services are operable to a mode where location services are disabled, from an audible alert mode to a silent mode, from a mode where local area network communications are operable to a mode where local area network communications are disabled, and so forth. Other examples of "togglable" modes will be described below with reference to FIG. 8. Still others will be obvious to those of ordinary skill in the art having the benefit of this disclosure.

In one or more embodiments, an electronic device comprises a touch sensitive surface, one example of which is a touch sensitive display. One or more processors are operable with the touch sensitive surface within the electronic device.

In one or more embodiments, the touch sensitive display or surface presents a first user actuation target and a second user actuation target. In one or more embodiments, the first user actuation target and the second user actuation target are persistently presented on the touch sensitive display such that they remain present across two or more applications operating on the one or more processors.

In one or more embodiments, the touch sensitive display or surface detects touch input at the first user actuation target and the second user actuation target within a predefined time. When this occurs, the one or more processors switch, in response to this detected touch input, the electronic device from a first mode of operation to a second mode of operation.

In one or more embodiments, the electronic device further includes a communication device that is operable with the one or more processors. In one or more embodiments, the communication device is configured to operate in accordance with a first data communication protocol and a second data communication protocol. In one or more embodiments, the one or more processors switch, in response to this detected touch input, the communication device from a first mode of operation to a second mode of operation by causing it to switch from a mode of communicating in accordance with the first data communication protocol to a mode of communicating in accordance with the second data communication protocol.

In one or more embodiments, the process can repeat. Illustrating by example, when the electronic device is operating in the second mode of operation, the touch sensitive display or surface can detect another touch input interacting with the first user actuation target and the second user actuation target within the predefined time. In one embodiment, this second touch input is the same as the first touch input. In another embodiment, this second touch input interacts with the first user actuation target and the second user actuation target in opposite ways.

For instance, if the touch input causing the switch from the first mode of operation to the second mode of operation is a Z-shaped gesture, in one or more embodiments the second touch input may comprise a Z-shaped gesture as well. By contrast, in other embodiments where the touch input causing the switch from the first mode of operation to the second mode of operation is a Z-shaped gesture, the second touch input may comprise a reverse Z-shaped gesture, and so forth. In one or more embodiments, when this other touch input is detected, the one or more processors switch the electronic device from the second mode of operation back to the first mode of operation.

Advantageously, embodiments of the disclosure allow a user to quickly switch operating modes in an electronic device by delivering a gesture, such as a Z-shaped touch gesture, that triggers logic and/or one or more processors of the electronic device to toggle the operating mode between at least a first operating mode and at least a second operating mode. As will be described in more detail below with reference to FIG. 7, in other embodiments third modes of operation, or even more modes of operation, can be selected with an equally simple gesture or touch input. Other advantages offered by embodiments of the disclosure will be described below. Still others will be obvious to those of ordinary skill in the art having the benefit of this disclosure.

Turning now to FIG. 1, illustrated therein is one explanatory electronic device 100 configured in accordance with one or more embodiments of the disclosure. It should be noted that the electronic device 100 includes many components that are optional, but which are included in an effort to demonstrate how varied electronic devices configured in accordance with embodiments of the disclosure can be.

Illustrating by example, in one or more embodiments the electronic device 100 includes a touch sensitive surface, one example of which is the touch sensitive display 101 shown in FIG. 1. In one or more embodiments, one or more processors 110 are operable with the touch sensitive display 101. In one or more embodiments, the touch sensitive display 101 detects touch input at a surface 104 of the touch sensitive display 101. Where the touch input interacts with a first user actuation target 102 and a second user actuation target 103, optionally multiple times and optionally within a predefined time period, in one or more embodiments the one or more processors 110 change an operating mode of the electronic device 100 from a first mode of operation to a second mode of operation.

In such an embodiment, a component such as an audio input/processor 106 would be optional, in it is not required for this touch-based toggling between modes of operations. Thus, it is to be understood that FIG. 1 is provided for illustrative purposes only and for illustrating components of one electronic device 100 in accordance with embodiments of the disclosure, and is not intended to be a complete schematic diagram of the various components required for an electronic device 100. Therefore, other electronic devices in accordance with embodiments of the disclosure may include various other components not shown in FIG. 1, or may include a combination of two or more components or a division of a particular component into two or more separate components, and still be within the scope of the present disclosure.

A block diagram schematic 107 of the electronic device 100 is also shown in FIG. 1. It should be noted that the electronic device 100 can be one of various types of devices. In one embodiment, the electronic device 100 is a portable electronic device, one example of which is a smartphone that will be used in the figures for illustrative purposes. However, it should be obvious to those of ordinary skill in the art having the benefit of this disclosure that the block diagram schematic 107 could be used with other devices as well, including palm-top computers, tablet computers, gaming devices, media players, wearable devices, or other portable wireless communication devices. Still other devices will be obvious to those of ordinary skill in the art having the benefit of this disclosure.

In one or more embodiments, the block diagram schematic 107 is configured as a printed circuit board assembly disposed within a housing 105 of the electronic device 100. Various components can be electrically coupled together by conductors or a bus disposed along one or more printed circuit boards.

The illustrative block diagram schematic 107 of FIG. 1 includes many different components. Embodiments of the disclosure contemplate that the number and arrangement of such components can change depending on the particular application. Accordingly, electronic devices configured in accordance with embodiments of the disclosure can include some components that are not shown in FIG. 1, and other components that are shown may not be needed and can therefore be omitted.

The illustrative block diagram schematic 107 includes a user interface 108. In one or more embodiments, the user interface 108 includes the touch sensitive display 101. In one embodiment, users can deliver user input commands to perform control operations to the touch sensitive display 101 by delivering touch input from a finger, stylus, or other objects disposed proximately with, or touching the surface 104 of, the touch sensitive display 101. The one or more processors 110 then interpret this touch input as a user input command to perform a control operation. For example, if a person touches the surface 104 of the touch sensitive display at a user actuation target 109 corresponding to an application, the one or more processors 110 may interpret this touch input as a user input command to launch the application, and so forth.

As used herein, a "user actuation target" comprises an interactive object, located at a predefined location of a touch sensitive surface of an electronic device, that when, for example, the surface 104 of the touch sensitive display 101 is touched at a location corresponding to the user actuation target, e.g., user actuation target 109, causes a control operation within the electronic device 100 to occur. Thus, when a user actuation target 109 is actuated by touch input, user input is delivered to the electronic device 100 to cause a control operation to occur.

It should be noted that the user actuation targets configured in accordance with embodiments of the disclosure can be visible or non-visible. In the illustrative embodiment of FIG. 1, user actuation target 109 is an interactive graphical object presented on the touch sensitive display 101. However, other user actuation targets need not be graphical objects. They can instead be predefined locations or areas of touch sensitive surfaces. If, for example, the touch sensitive surface were a touch sensitive slider bar configured as a rectangle, one user actuation target could be the area adjacent to one minor side of the rectangle, while a second user actuation target could be another area adjacent to the opposite side of the rectangle, and so forth.

In the illustrative embodiment of FIG. 1, the touch sensitive surface of the electronic device 100 is the touch sensitive display 101. Accordingly, user actuation targets 102,103,109 are configured as interactive graphical objects presented on the touch sensitive display 101.

In one or more embodiments, user actuation targets configured in accordance with embodiments of the disclosure can be configured to replicate traditional key structures. However, as shown in the illustrative embodiment of FIG. 1, may also take any of variety of customized shapes, such as the Buster the Dog shape of user actuation target 109.

In one or more embodiments, the user actuation targets can be configured as virtual "keys" to launch applications. In the illustrative embodiment of FIG. 1, one might lunch a social networking application by touching user actuation target 109, for example.

In other embodiments, the user actuation targets are configured as mode-switching user actuation targets, two of which are user actuation target 102 and user actuation target 103. With these mode-switching user actuation targets, simply touching them has no user input effect. However, as will be described in more detail below, in one or more embodiments touch input interacting with at least two mode-switching user interaction targets, optionally within a predefined time and optionally at least two times within the predefined time, causes one or more processors to alter a mode of operation of the electronic device 100 from a first mode of operation to a second mode of operation.

Returning to the electronic device 100, in one embodiment, the touch sensitive display 101 is configured as an active matrix organic light emitting diode (AMOLED) display. However, it should be noted that other types of displays, including liquid crystal displays, suitable for use with the user interface 108 would be obvious to those of ordinary skill in the art having the benefit of this disclosure.

In one embodiment, the electronic device includes one or more processors 110. In one embodiment, the one or more processors 110 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the block diagram schematic 107. Each of the application processor and the auxiliary processor(s) can be configured to process and execute executable software code to perform the various functions of the electronic device with which the block diagram schematic 107 operates. A storage device, such as memory 111, can optionally store the executable software code used by the one or more processors 110 during operation.

In this illustrative embodiment, the block diagram schematic 107 also includes a wireless communication device 112 that can be configured for wired or wireless communication with one or more other devices or networks. The wireless communication device 112 can include wireless communication circuitry, including one of a receiver, a transmitter, or transceiver, and one or more antennas. In one or more embodiments, the wireless communication device 112 is capable of communicating with one or more remote devices across a wide area network, local area network, small local area network (piconet), or personal area networks.

Examples of wide area networks include "2G" networks such as GSM, CDMA, W-CDMA, CDMA-2000, iDEN, TDMA, "2.5G" networks such as 2.5 Generation 3GPP GSM networks, "3G" networks such as 3rd Generation 3GPP WCDMA networks, 3GPP Long Term Evolution (LTE) networks, and 3GPP2 CDMA communication networks, "4G" Networks such as 4GPP LTE networks, "5G" networks such as 3GPP 5G NR networks, UMTS networks, E-UTRA networks, GPRS networks, iDEN networks, and other networks.

In one or more embodiments, the wireless communication device 112 can include a local area network front end and a wide area network communication front end. The local area network front end can be configured to communicate using multiple types of local area network communication protocols. Examples of local area networks include HomeRF, Bluetooth.sup.™, and IEEE 802.11 (a, b, g or n) or other similar Wi-Fi networks. Examples of ad hoc peer-to-peer networks include the one-hop and two-hop communication networks, with the former being referred to as a "piconet." For example, the local area network front end can include both a Wi-Fi circuit and another local area wireless communication circuit. The Wi-Fi circuit can, in one embodiment, communicate via an IEEE 802.11 protocol, while the other local area wireless communication circuit can, in one embodiment, communicate with a communication protocol other than the 802.11 standard.

In one or more embodiments the wireless communication device 112 is configured to communicate with at least two wireless communication networks, optionally using two different wireless communication protocols. Illustrating by example, in one or more embodiments the wireless communication device 112 is configured to operate in at least a first mode of operation, wherein the communication device 112 communicates with a first wireless communication network while operating in accordance with a first data communication protocol, and at least a second mode of operation, wherein the communication device 112 communicates with a second wireless communication network while operating in accordance with a second data communication protocol.

In one or more embodiments, the electronic device 100 can be configured as a DSDS device, with the first data communication protocol comprising a 2G communication protocol, e.g., a CDMA or GSM communication protocol, while the second data communication protocol comprises a 4G communication protocol, e.g., an LTE communication protocol. However, embodiments of the disclosure are not so limited. In the illustrative embodiment of FIG. 1, as indicated by the first user actuation target 102 and the second user actuation target 103, in another embodiment the first data communication protocol comprises a wireless LAN communication protocol, while the second data communication protocol comprises a wireless WAN communication protocol. Other combinations of data communication protocols defining communication links with various types of networks will be obvious to those of ordinary skill in the art having the benefit of this disclosure. Moreover, the communication device 112 can, of course, be operable with three or more communication networks and corresponding communication protocols as well.

In one embodiment, the one or more processors 110 can be responsible for performing the primary functions of the electronic device with which the block diagram schematic 107 is operational. For example, in one embodiment the one or more processors 110 comprise one or more circuits operable with the user interface 108 to present presentation information to a user. The executable software code used by the one or more processors 110 can be configured as one or more modules 113 that are operable with the one or more processors 110. Such modules 113 can store instructions, control algorithms, and so forth.

In one or more embodiments, the one or more processors 110 are responsible for running the operating system environment 114. The operating system environment 114 can include a kernel 115 and one or more drivers, and an application service layer 116, and an application layer 117. The operating system environment 114 can be configured as executable code operating on the one or more processors 110 or other control circuits of the electronic device 100.

The application layer 117 can be responsible for executing application service modules. The application service modules may support one or more applications or "apps." Examples of such applications shown in FIG. 1 include a web browsing application 118 configured to allow the user to view webpages on the touch sensitive display 101 of the electronic device 100, an electronic mail application 119 configured to send and receive electronic mail, and a photo application 120 configured to permit the user to view images or video on the touch sensitive display 101 of electronic device 100. These applications are illustrative only. Others are shown in FIG. 1. Still others will be obvious to one of ordinary skill in the art having the benefit of this disclosure.

The applications of the application layer 117 can be configured as clients of the application service layer 116 to communicate with services through application program interfaces (APIs), messages, events, or other inter-process communication interfaces. Where auxiliary processors are used, they can be used to execute input/output functions, actuate user feedback devices, and so forth.

In the illustrative embodiment of FIG. 1, the applications of the application layer 117 are presented on the touch sensitive display 101 as user actuation targets. These user actuation targets are virtual buttons or keys or visual targets that, when touch input is received on the surface 104 of the touch sensitive display 101 above the user actuation target, cause a control operation to be performed. Illustrating by example, touching the user actuation target 109 shaped like Buster the Dog causes, in one or more embodiments, a social media application 121 to launch and present photographs on the surface 104 of the touch sensitive display 101. Effectively, in one or more embodiments these user actuation targets identify locations along the surface 104 of the touch sensitive display 101 that, when touch input is received at that location, cause the touch input to be identified as a user command to perform a control operation, e.g., launching an application.

In one or more embodiments, the user actuation targets are divided into two types of user actuation targets. A first type of user actuation target, e.g., user actuation target 109, is a standard mode user actuation target. With standard mode user actuation targets, simply delivering touch input to the location of the standard mode user actuation target on the surface 104 of the touch sensitive display 101, and optionally releasing the surface 104 thereafter, delivers a user input command requesting performance of a control operation. Thus, again using the example of the user actuation target 109 for the social media application 121, touching and releasing the surface 104 of the touch sensitive display 101 at the location of the user actuation target 109 could comprise a user input command requesting performance of a control operation such as launching the social media application 121.

In one or more embodiments, as noted above, a second type of user actuation target is referred to as mode-switching user actuation targets. Examples of mode-switching user actuation targets in FIG. 1 include user actuation target 102 and user actuation target 103. With these mode-switching user actuation targets, simply touching them has no user input effect. However, in one or more embodiments touch input interacting with at least two mode-switching user interaction targets, optionally within a predefined time and optionally at least two times within the predefined time, causes one or more processors to alter a mode of operation of the electronic device 100 from a first mode of operation to a second mode of operation.

Of course, user actuation targets can be configured as combination standard mode and mode-switching user actuation targets. Illustrating by example, in target bar 122, persistent user actuation target 123 and persistent user actuation target 124 are present. In one or more embodiments, touching either causes a corresponding application to launch. However, since these user actuation targets are persistent, they remain present on the touch sensitive display 101 when the applications are active. Accordingly, interacting with them both a plurality of times within a predefined time period, such as by making a Z-shaped motion between them, can cause the inactive application to become the active application and so forth. Other configurations for user actuation targets will be obvious to those of ordinary skill in the art having the benefit of this disclosure.

In one or more embodiments, the block diagram schematic 107 includes an audio input/processor 106. The audio input/processor 106 can include hardware, executable code, and speech monitor executable code in one embodiment. The audio input/processor 106 can include, stored in memory 111, basic speech models, trained speech models, or other modules that are used by the audio input/processor 106 to receive and identify voice commands that are received with audio input captured by an audio capture device.

In one embodiment, the audio input/processor 106 can include a voice recognition engine. Regardless of the specific implementation utilized in the various embodiments, the audio input/processor 106 can access various speech models to identify speech commands. In one embodiment, the audio input/processor 106 is configured to implement a voice control feature that allows a user to speak a specific device command to cause the one or more processors 110 to execute a control operation.

Various sensors can be operable with the one or more processors 110. FIG. 1 illustrates several examples such sensors. It should be noted that those shown in FIG. 1 are not comprehensive, as others will be obvious to those of ordinary skill in the art having the benefit of this disclosure. Additionally, it should be noted that the various sensors shown in FIG. 1 could be used alone or in combination. Accordingly, many electronic devices will employ only subsets of the sensors shown in FIG. 1, with the particular subset defined by device application.

A first example of a sensor that can be included with the electronic device 100 is a touch sensor 125. The touch sensor 125 can include a capacitive touch sensor, an infrared touch sensor, an inductive touch sensor, a thermal touch sensor, resistive touch sensors, or another touch sensitive technology. Capacitive touch sensitive devices include a plurality of capacitive sensors, e.g., electrodes, which are disposed along a substrate. Each capacitive sensor is configured, in conjunction with associated control circuitry, e.g., the one or more processors 110, to detect an object in close proximity with—or touching—the surface 104 of the touch sensitive display 101 or another touch sensitive surface positioned along the housing 105 of the electronic device 100 by establishing electric field lines between pairs of capacitive sensors and then detecting perturbations of those field lines.

The electric field lines can be established in accordance with a periodic waveform, such as a square wave, sine wave, triangle wave, or other periodic waveform that is emitted by one sensor and detected by another. The capacitive sensors can be formed, for example, by disposing indium tin oxide patterned as electrodes on the substrate. Indium tin oxide is useful for such systems because it is transparent and conductive. Further, it is capable of being deposited in thin layers by way of a printing process. The capacitive sensors may also be deposited on the substrate by electron beam evaporation, physical vapor deposition, or other various sputter deposition techniques.

Another example of a sensor is a geo-locator that serves as a location detector 126. In one embodiment, location detector 126 is able to determine location data of the electronic device 100 by capturing the location data from a constellation of one or more earth orbiting satellites, or from a network of terrestrial base stations to determine an approximate location. The location detector 126 may also be able to determine location by locating or triangulating terrestrial base stations of a traditional cellular network, such as a CDMA network or GSM network, or from other local area networks, such as Wi-Fi networks.

One or more motion sensors 127 can be configured as an orientation detector 128 that determines an orientation and/or movement of the electronic device 100 in three-dimensional space. Illustrating by example, the one or more motion sensors 127 can include an accelerometer, one or more gyroscopes, a barometer, camera, or other devices to detect device orientation and/or motion of the electronic device 100. Using an accelerometer as an example, an accelerometer can be included to detect motion of the electronic device.

In one or more embodiments, the orientation detector 128 can determine the spatial orientation of an electronic device 100 in three-dimensional space by, for example, detecting a gravitational direction. In addition to, or instead of, an accelerometer, an electronic compass can be included as one of the other devices to detect the spatial orientation of the electronic device 100 relative to the earth's magnetic field. Similarly, one or more gyroscopes can be included to detect rotational orientation of the electronic device 100.

Additionally, the accelerometer can be used as a gesture detector 129 to sense some of the gestures of the user, such as one talking with their hands, running, or walking. The one or more motion sensors 127 can optionally include a barometer operable to sense changes in air pressure due to elevation changes or differing pressures of the electronic device 100.

The gesture detector 129 can also be configured to function with the touch sensor 125 to monitor gestures along the surface 104 of the touch sensitive display 101 as well. For example, the gesture detector 129 can buffer motion of a finger, stylus, or other object to determine the shapes, movements, and other characteristics of an object moving along the surface 104 of the touch sensitive display 101. Accordingly, the gesture detector 129 can determine if something touches the surface 104 of the touch sensitive display 101 or moves along the surface 104 of the touch sensitive display 101 and, if the latter, the shape in which the object moves along the surface 104 of the touch sensitive display 101.

In one or more embodiments, a mode switcher 132 is operable with the gesture detector 129 to switch, in response to the touch input in the form of a gesture detected by the gesture detector 129, the electronic device 100 from a first mode of operation to a second mode of operation. Illustrating by example, in one or more embodiments where the touch sensitive display 101, optionally operating with the gesture detector 129, detects user input interacting with a first user actuation target, e.g., user actuation target 102, and a second user actuation target, e.g., user actuation target 103, within a predefined time, the mode switcher 132 can change an operating mode of the electronic device from a first mode of operation to a second mode of operation. This operation will be described in more detail below with reference to FIGS. 3-5.

Other components 130 operable with the one or more processors 110 can include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as a loudspeaker disposed behind a speaker port or other alarms and/or buzzers and/or a mechanical output component such as vibrating or motion-based mechanisms.

In one or more embodiments, the electronic device 100 includes an imager 131. In one embodiment, the imager 131 comprises a two-dimensional imager configured to receive at least one image of a person within an environment of the electronic device 100. In one embodiment, the imager 131 comprises a two-dimensional Red-Green-Blue (RGB) imager. In another embodiment, the imager 131 comprises an infrared imager. Other types of imagers suitable for use as the imager 131 will be obvious to those of ordinary skill in the art having the benefit of this disclosure.

In one or more embodiments, the imager 131 is operable to capture at least one image of an object situated within a predefined radius of the electronic device 100. In one or more embodiments, the images captured by the imager 131 can be compared to one or more predefined reference files stored in the memory 111. By making such a comparison, one or more processors 110 can confirm whether the shape, skin tone, eye color, hair color, hair length, and other features identifiable in a two-dimensional image are that of an authorized user identified by the one or more predefined reference images stored in the predefined reference files.

Figure 2:
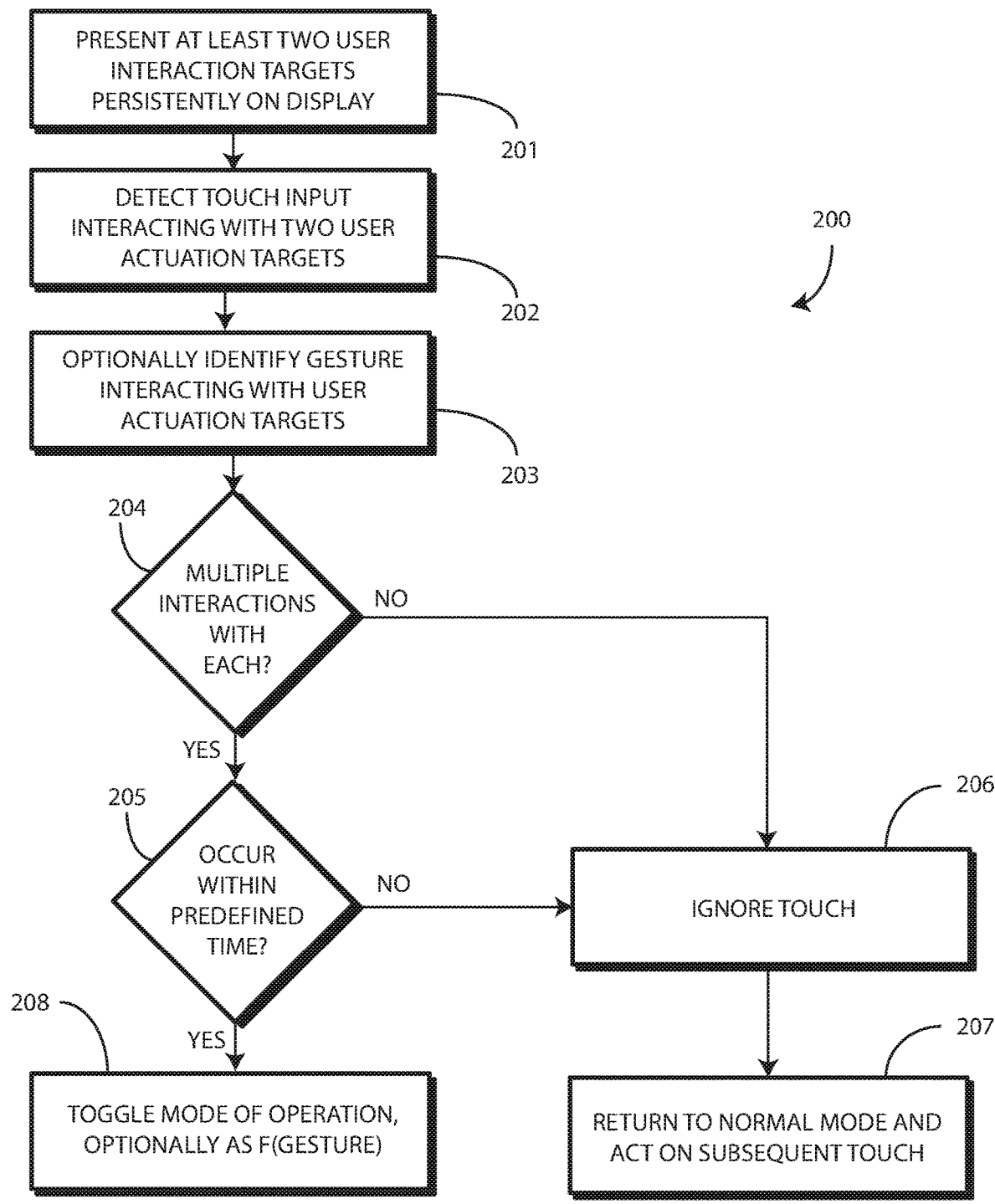
FIG. 2 illustrates one explanatory method in accordance with one or more embodiments of the disclosure.

Now that various hardware components have been described, attention will be turned to methods of using electronic devices in accordance with one or more embodiments of the disclosure. Turning now to FIG. 2, illustrated therein is one explanatory general method 200 for using the electronic device (100) of FIG. 1 to quickly, easily, and simply alter a mode of operation of an electronic device from a first mode of operation to a second mode of operation in accordance with one or more embodiments of the disclosure. More detailed methods will be described thereafter with reference to FIGS. 3-5.

Beginning at step 201, the method 200 comprises presenting, on a touch sensitive surface of an electronic device, a first user actuation target and a second user actuation target. In one or more embodiments, the first user actuation target and the second user actuation target each comprise mode-switching user actuation targets. In other embodiments, each of the first user actuation target and the second user actuation target comprise combination standard mode and mode-switching user actuation targets. Of course, combinations of mode-switching user actuation targets and combination standard mode and mode-switching user actuation targets can be presented at step 201 as well. Moreover, standard mode user actuation targets can be presented in addition to mode-switching user actuation targets and/or combination standard mode and mode-switching user actuation targets as well.

In one or more embodiments, step 201 comprises persistently presenting the first user actuation target and the second user actuation target on the touch sensitive surface of the electronic device. In one or more embodiments, step 201 includes the first user actuation target and the second user actuation target being persistently presented on the touch sensitive surface or display so that they are readily available across multiple applications regardless the application that may be actively operating on the electronic device.

In one or more embodiments, step 201 comprises persistently presenting the first user actuation target and the second user actuation target in a predefined location along the touch sensitive surface. Illustrating by example, in one or more embodiments step 201 comprises persistently presenting the first user actuation target and the second user actuation target in a status bar that is continually present on the display across multiple applications. Such a status bar (133) was illustrated above in FIG. 1 with user actuation target (102) and user actuation target (103) presented thereon. In such an embodiment, a user can access persistently presented user actuation targets presented thereon without terminating a currently operational application in one or more embodiments.

Where step 201 comprises persistently presenting the first user actuation target and the second user actuation target, in one or more embodiments step 201 would comprise presenting the first user actuation target and the second user actuation target across at least two applications. Accordingly, step 201 would comprise persistently presenting both the first user actuation target and the second user actuation target when operating in the first mode of operation, and also persistently presenting both the first user actuation target and the second user actuation target when operating in the second mode of operation as well.

At step 202, the method 200 detects, with a touch sensitive surface, touch sensor, or touch sensitive display, user input interacting with the first user interaction target and second user interaction target presented at step 201. This interaction can occur in a variety of ways. In one embodiment, step 202 comprises detecting touch input at the first user actuation target and the second user actuation target. In another embodiment, shown at step 203, the method optionally comprises detecting a user gesture occurring along a surface of a touch sensitive display that passes over the first user actuation target and the second user actuation target. Other method steps for detecting user interaction with the first user actuation target and the second user actuation target will be obvious to those of ordinary skill in the art having the benefit of this disclosure.

At decision 204, the method 200 optionally determines whether the user input, the touch input, and/or the gesture input interacted with each of the first user actuation target and the second user actuation target more than once. In one or more embodiments, the method 200 requires multiple interactions, touches, or gesture movements with both the first user actuation target and the second user actuation target prior to a mode switch occurring to prevent falsely switching modes without the user intending to do so.

The number above two can vary. In one embodiment, decision 204 comprises determining whether the user input, the touch input, and/or the gesture input interacted with each of the first user actuation target and the second user actuation target at least twice. In another embodiment, decision 204 comprises determining whether the user input, the touch input, and/or the gesture input interacted with each of the first user actuation target and the second user actuation target exactly twice.

In still another embodiment, decision 204 comprises determining whether the user input, the touch input, and/or the gesture input interacted with each of the first user actuation target and the second user actuation target more than three times. In yet another embodiment, decision 204 comprises determining whether the user input, the touch input, and/or the gesture input interacted with each of the first user actuation target and the second user actuation target exactly three times. Other predetermined numbers of interactions, touches, inputs, or gesture movements may need to be required to interact with each of the first user actuation target and the second user actuation target will be obvious to those of ordinary skill in the art having the benefit of this disclosure.

At decision 205, the method 200 determines whether the user input, the touch input, and/or the gesture input interacted with each of the first user actuation target and the second user actuation target within a predetermined time or time period. Illustrating by example, in one or more embodiments decision 205 determines whether the user input, the touch input, and/or the gesture input interacted with each of the first user actuation target and the second user actuation target within a period of one second. In another embodiment, decision 205 determines whether the user input, the touch input, and/or the gesture input interacted with each of the first user actuation target and the second user actuation target within a period of five seconds.

In still another embodiment, decision 205 determines whether the user input, the touch input, and/or the gesture input interacted with each of the first user actuation target and the second user actuation target within a period of ten seconds. Other durations below which the user input, the touch input, and/or the gesture input must interact with each of the first user actuation target and the second user actuation target for a mode switching operation to occur will be obvious to those of ordinary skill in the art having the benefit of this disclosure.

Where the user input, the touch input, and/or the gesture input failed to interact with each of the first user actuation target and the second user actuation target within the predetermined amount of time, as determined at decision 205, and optionally at or beyond the predetermined number of instances, as determined at decision 205, the method moves to step 206 where the touch input, user input, or user gesture is ignored. The electronic device will return to its normal mode of operation upon receiving another touch input, user input, or gesture at step 207.

However, where the user input, the touch input, and/or the gesture input does interact with each of the first user actuation target and the second user actuation target within the predetermined amount of time, as determined at decision 205, and optionally at or beyond the predetermined number of instances, as determined at decision 205, the method moves to step 208 where an operating mode is changed.

In one embodiment, step 208 comprises changing an operating mode of the electronic device from a first mode of operation to a second mode of operation. In another embodiment, step 208 comprises switching, in response to the touch input, the electronic device from a first mode of operation to a second mode of operation. In still another embodiment, step 208 comprises altering a mode of operation of the electronic device from a first mode of operation to a second mode of operation.

As noted at the beginning of this specification, one application well suited for embodiments of the disclosure comprises switching a data communication link to a communication network, and optionally the predefined communication protocol with which a communication device of the electronic device communicates, when changing the mode of operation. Continuing the DSDS electronic device example set forth above, in one or more embodiments step 208 comprises changing from a first mode of operation, e.g., communicating via a data link of the 2G network, to a second mode of operation, e.g., communicating via a data link of the 4G network. Thus, in such an embodiment step 208 comprises changing the operating mode of the electronic device from a first mode of operation, e.g., the active communication link to its associated network, to a second mode of operation, e.g., the inactive communication link to its associated network.

Figure 8:
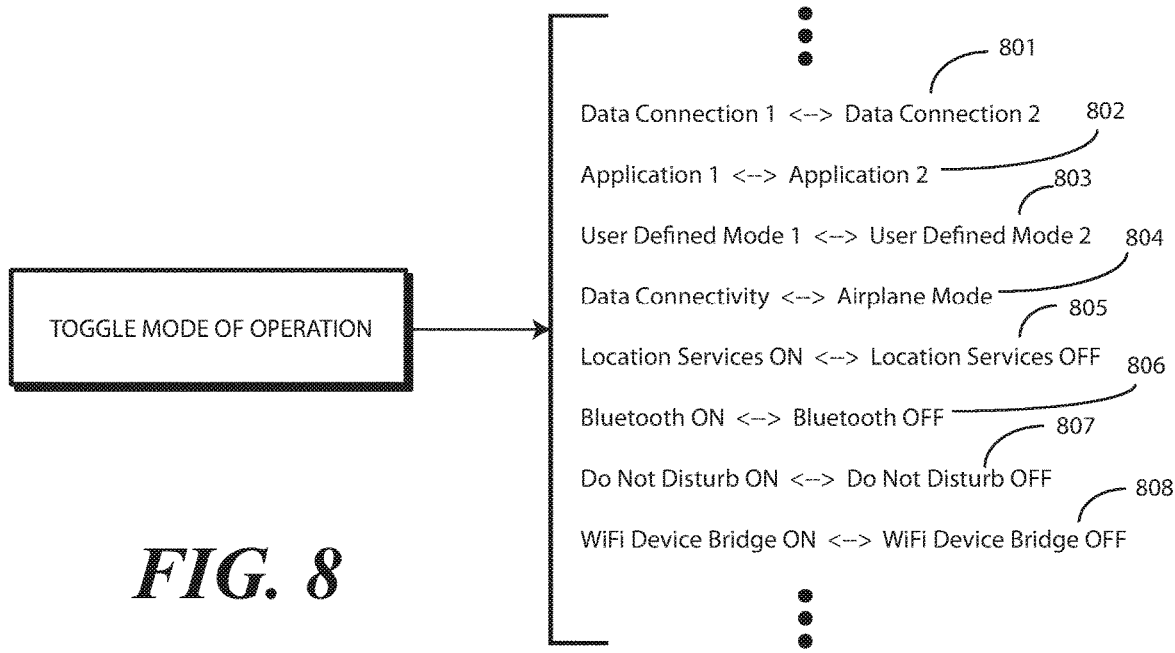
FIG. 8 illustrates one or more explanatory operating modes that can be changed in accordance with one or more embodiments of the disclosure.

While this is one suitable use for the method 200 of FIG. 2, it is by far not the only one. Turning briefly to FIG. 8, illustrated therein are several other explanatory applications for the systems, methods, and devices configured in accordance with embodiments of the disclosure. Others will be obvious to those of ordinary skill in the art having the benefit of this disclosure.

As shown at 801, in one or more embodiments one or more processors and/or a mode switcher can change the operating mode of the electronic device from a first mode of operation to a second mode of operation by changing a data connection and/or communication protocol to an external network. In one or more embodiments, the external network is a wide area network. Illustrating by example, the one or more processors may cause a communication device to switch from communicating on a first type of communication network, e.g., a GSM network, to communicating with a second type of communication network, e.g., a CDMA network.

In another embodiment, the one or more processors may cause a communication device to switch from communicating with a communication link to a 2G network to another communication link communicating to 4G network in a DSDS device, as noted above. In still another embodiment, the one or more processors may cause a communication device to switch from communicating on a CDMA network to a LTE network. In still another embodiment, the one or more processors may cause a communication device to switch from communicating on a LTE network to a GSM network. These examples are illustrative only, as there are numerous wide area network types listed that can be switched at 801 in various combinations. Thus, other wide area networks and/or communication protocols can be switched at 801 aside from those described here.

At 802, the one or more processors and/or a mode switcher can change the operating mode of the electronic device from a first mode of operation to a second mode of operation by switching from an active application to an inactive application. Illustrating by example, if a word processing application is active on the electronic device, and a web browsing application is not, but persistent user interaction targets are present on the touch sensitive surface of the electronic device, in one or more embodiments the user can deliver user input that interacts with these user actuation targets to cause the word processing application to become inactive, while making the web browsing application active. Another interaction with the user actuation targets can cause the opposite, making the word processing application once again active. This process shown at 802 can be used to switch between any two applications. As will be described in more detail below with reference to FIG. 7, the process can be used to switch between three or more applications in some embodiments as well.

Embodiments of the disclosure contemplate that in some instances a user may wish to define modes of operation. For example, a user may prefer a first mode of operation to include a bright screen, muted audio, and disabled haptics, while a second mode of operation employs a dimmed screen, mid-volume audio, and active haptics. Accordingly, in one or more embodiments at 803 one or more processors and/or a mode switcher can change the operating mode of the electronic device from a first mode of operation to a second mode of operation by switching from a first user defined mode of operation to a second user defined mode of operation. The myriad of ways a user can define the first mode of operation the second mode of operation will be obvious to those of ordinary skill in the art having the benefit of this disclosure.

At 804, the one or more processors and/or a mode switcher can change the operating mode of the electronic device from a first mode of operation to a second mode of operation by switching from a mode in which the electronic device can communicate with one or more networks as described above with reference to FIG. 1 to one in which data communication is precluded. This latter mode is sometimes known as the "airplane mode."

At 805, the one or more processors and/or a mode switcher can change the operating mode of the electronic device from a first mode of operation to a second mode of operation by switching from a mode of operation where the location of the electronic device can be determined due to the fact that the location detector is active, to a second mode of operation where these location detection services are disabled. A user may wish to enable location services, for instance, when using a navigation application, but may prefer not to have location services enabled when at home.

At 806, the one or more processors and/or a mode switcher can change the operating mode of the electronic device from a first mode of operation to a second mode of operation by switching from a mode of operation where local area network communication capabilities of a communication device are enabled, to one where local area network communication capabilities are disabled. Illustrating by example, 806 may include switching from a first mode of operation where Wi-Fi communication capabilities of a communication device are enabled, to one where those Wi-Fi communication capabilities are disabled. In another embodiment, 806 may comprise switching from a first mode of operation where Bluetooth.sup.™ capabilities are enabled to one where Bluetooth.sup.™ capabilities are disabled, and so forth. Of course, by interacting with user actuation targets again, the reverse process can occur, switching from a mode where local area network communication capabilities are disabled to one where they are enabled as well.

At 807, the one or more processors and/or a mode switcher can change the operating mode of the electronic device from a first mode of operation to a second mode of operation by switching from a mode in which alerts from incoming communications are generated to one in which those alerts are precluded. This is sometimes known as a "do not disturb" mode, where when activated ringtones and other audible alerts, as well as haptic alerts, are precluded. By contrast, when the do not disturb mode is OFF, audible and haptic alerts are enabled.

At 808, the one or more processors and/or a mode switcher can change the operating mode of the electronic device from a first mode of operation to a second mode of operation by switching from a mode where the electronic device works as a local area network hub by communicating with local electronic devices and delivering that data to a wide area network, to one where those capabilities are turned OFF. It should be noted that the list of modes of operation between which embodiments of the disclosure can switch shown in FIG. 8 is illustrative only. Numerous other modes between which switching or altering or changing can occur in response to user input, touch input, and/or gesture input will be obvious to those of ordinary skill in the art having the benefit of this disclosure.

Figure 3:
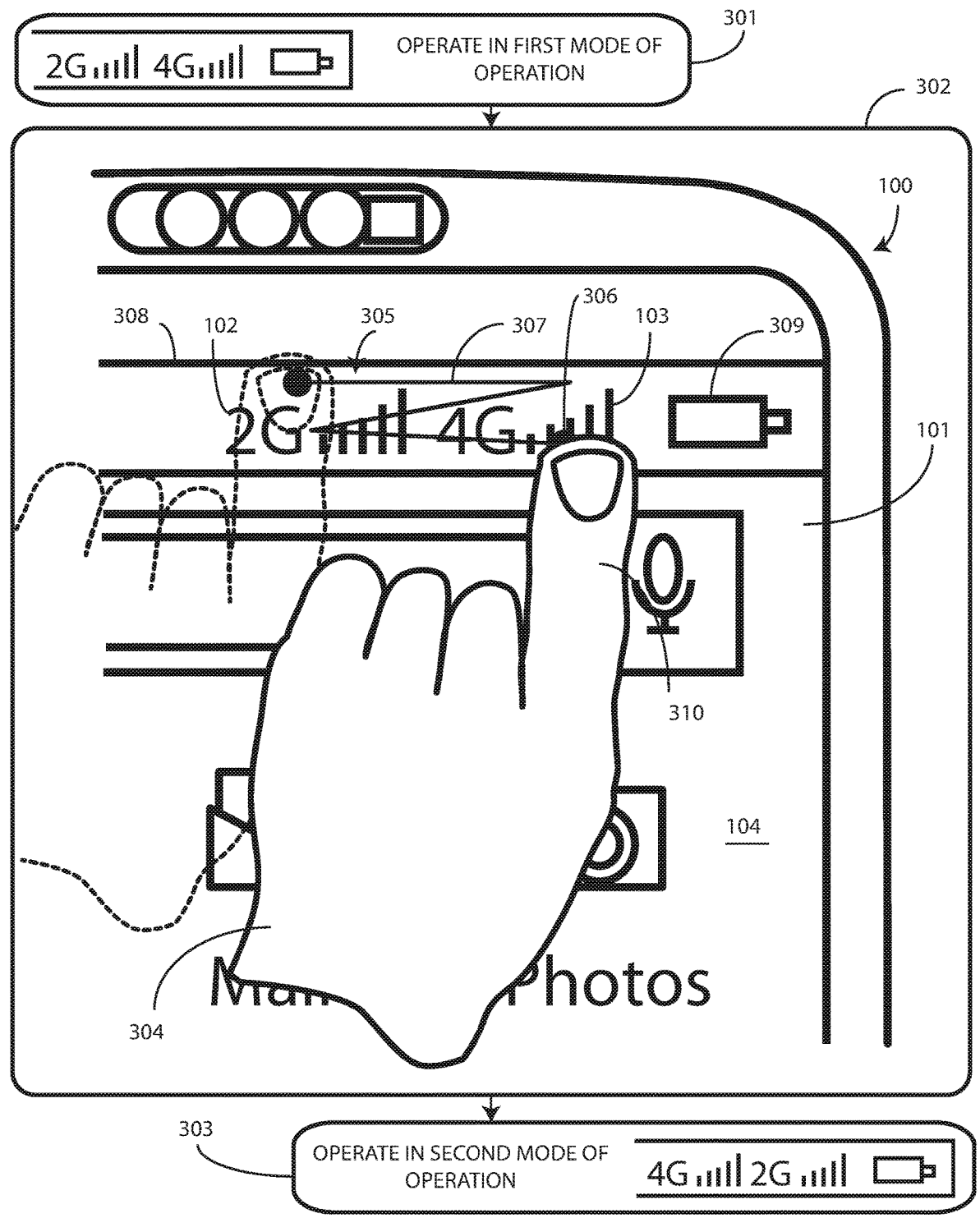
FIG. 3 illustrates one or more explanatory method steps in accordance with one or more embodiments of the disclosure.

Turning now to FIG. 3, illustrated therein are one or more method steps 301,302,303 in accordance with one or more embodiments of the disclosure. Beginning at step 301, an electronic device 100 is operating in a first mode of operation. The mode of operation can be any of those listed above with reference to FIG. 8. Alternatively, the mode of operation can be another mode of operation that is obvious to those of ordinary skill in the art having the benefit of this disclosure. In this illustrative embodiment, the first mode of operation comprises a communication device (112) communicating with a wide area network in accordance with a first communication protocol on a first communication link, which in this example is a 4G communication protocol being used to communicate on a communication link to a 4G network.

At step 302, the touch sensitive display 101 is persistently presenting a first user actuation target 102 and the second user actuation target 103. In this illustrative embodiment, the touch sensitive display 101 is persistently presenting a first user actuation target 102 and the second user actuation target 103 within a status bar 308 along with other graphical objects 309. In one or more embodiments, the other graphical objects 309 can also be configured as user actuation targets.

In this illustrative embodiment, each of the first user actuation target 102 and the second user actuation target 103 identifies a corresponding mode of operation. Said differently, the first user actuation target 102 identifies a first mode of operation comprising communicating with a wide area network in accordance with a first communication protocol, which in this example is a 4G communication protocol being used to communicate on a communication link to a 4G network.

This mode of operation is identified by the fact that the first user actuation target 102 comprises the letters "2G" along with a signal strength meter. Similarly, the second user actuation target 103 identifies a second mode of operation comprising communicating with a wide area network in accordance with a first communication protocol, which in this example is a 4G communication protocol being used to communicate with a 4G network. This mode of operation is identified by the fact that the second user actuation target 103 comprises the letters "4G" along with a signal strength meter.

In one or more embodiments, the active mode of operation is identified by the first user actuation target 102 and the second user actuation target 103 as well by their position on the touch sensitive display 101. As noted above, in this illustration the first mode of operation occurring at step 301 comprises a communication device (112) communicating with a 4G network. This is identified by positioning the second user actuation target 103 as the right-most user actuation target on the touch sensitive display. Since the second user actuation target 103 is exterior of the first user actuation target 102 in this example, the user 304 is alerted to the fact that the first mode of operation occurring at step 301 is communication with the 4G communication link to the 4G communication network.

At step 302, a user 304 wishes to cause the electronic device 100 to switch from the first mode of operation of step 301 to a second mode of operation. Accordingly, a user 304 delivers user input 305 to cause one or more processors (110) and/or a mode switcher (132) to change the first mode of operation to a second mode of operation. In this example, the user input 305 comprises touch input 306 that occurs in the form of a gesture 307. Since the first mode of operation is communicating with a wide area network in accordance with a first communication protocol, which in this example is a 4G communication protocol being used to communicate with a 4G network, the user 304 provides initial touch input 306 at the second user actuation target 103, which represents and identifies this first mode of operation.

Thereafter, the user 304 moves their finger 310 to define a gesture that interacts with the first user actuation target 102 and the second user actuation target 103 multiple times. Accordingly, the touch sensitive display 101 can detect a plurality of instances where the user input 305 interacts with the first user actuation target 102 and the second user actuation target 103. In this illustrative example, the gesture 307 comprises a zigzag gesture upon the surface 104 of the touch sensitive display 101 that interacts with each of the first user actuation target 102 and the second user actuation target 103 twice. As shown in FIG. 3, in this illustration the zigzag gesture defines a Z-shape that interacts with the second user actuation target 103 by beginning there and returning after interacting with the first user actuation target 102, and interacts with the first user actuation target 102 after the initial touch input 306 and at the end of the gesture 307.

In one or more embodiments, one or more processors (110) of the electronic device 100 confirm whether this double interaction with both the first user actuation target 102 and the second user actuation target 103 occurs within a predefined time, such as two seconds. Where it does, step 303 comprises changing, switching, or altering the first mode of operation of step 301 to a second mode of operation. In this illustrative example, the second mode of operation comprises a communication device (112) communicating with a wide area network in accordance with a second communication protocol, which in this example is a 2G communication protocol being used to communicate with a 2G network.

In one or more embodiments, the fact that the mode of operation has changed is identified on the touch sensitive display 101. As noted above, in one or more embodiments the active mode of operation is identified by the position of the first user actuation target 102 and the second user actuation target 103 on the touch sensitive display 101. In one or more embodiments, the right-most user actuation target on the touch sensitive display 101 identifies the active mode of operation. Since the active mode of operation at step 303 is communication using the communication link to the 2G network, first user actuation target 102 is now positioned exterior of the second user actuation target 103 after the mode change at step 303. Accordingly, the user 304 is alerted to the fact that the second mode of operation occurring at step 303 is communicating with the 2G communication link to the 2G communication network.

Figure 4:
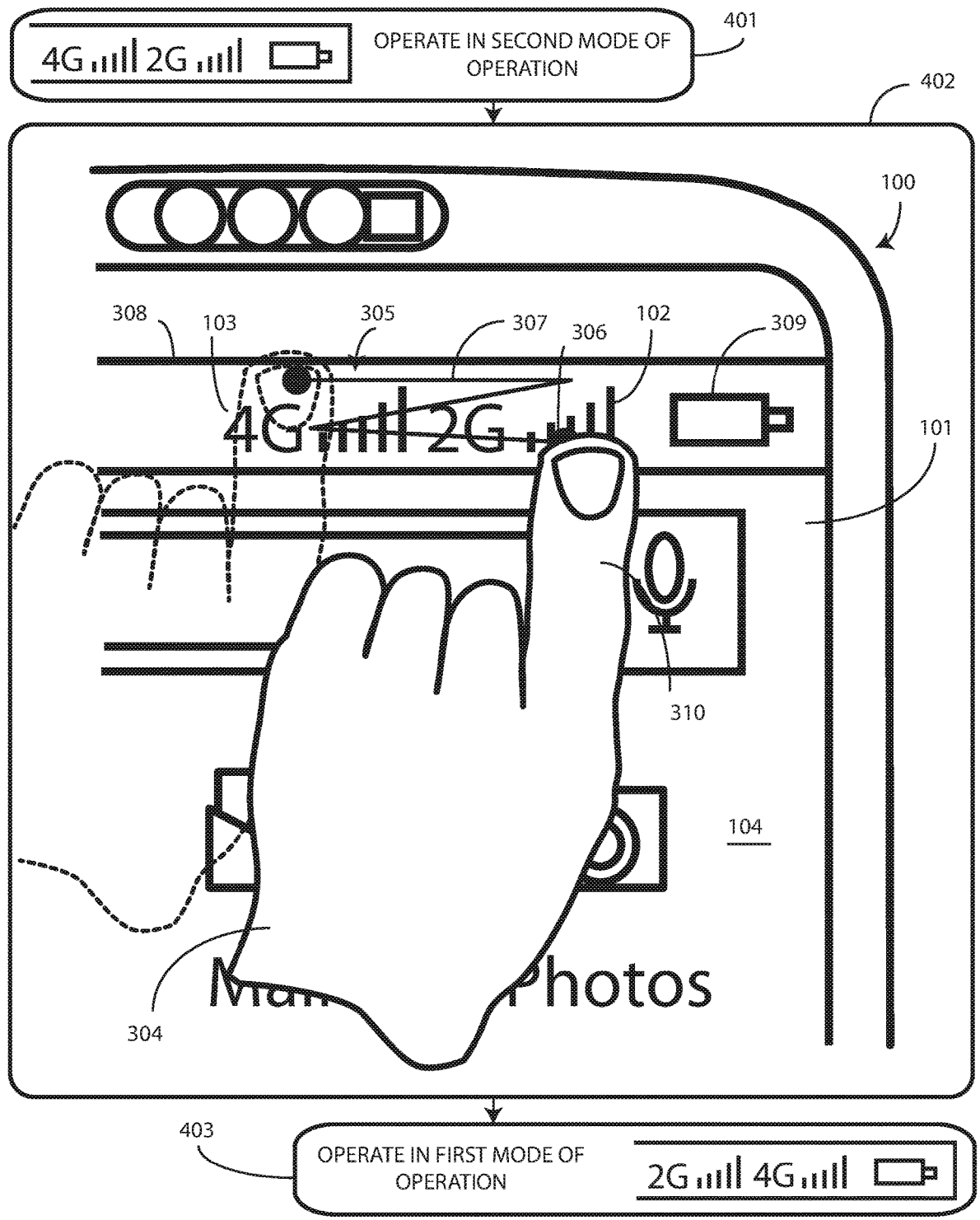
FIG. 4 illustrates one or more explanatory method steps in accordance with one or more embodiments of the disclosure.

Turning now to FIG. 4, at step 401 the electronic device 100 is operating in the second mode of operation identified at step (303) of FIG. 3. Continuing with the example of FIG. 3, this means that the communication device (112) of the electronic device 100 is communicating with the 2G communication link to the 2G communication network. That this is the active mode of operation is identified by the fact that the first user actuation target 1012 is the right most user actuation target in step 401.

At step 402, the user 304 wishes to cause the electronic device 100 to switch from the second mode of operation of step 401 back to the first mode of operation. In this illustrative embodiment, since the first user actuation target 102 and the second user actuation target 103 switched places when the mode of operation changed to alert the user 304 to the active mode of operation, in one or more embodiments the user 304 can make the identical motion that was made in step (302) above, thereby allowing a single gesture to cause a change from the first mode of operation to the second mode of operation, and then back from the second mode of operation to the first mode of operation.

Making such a motion is also intuitive, in that the user 304 starts the user input at the user actuation target 102 representing active mode of operation, thereafter moving to the user actuation target 103 representing the desired mode of operation, finally finishing on the user actuation target 103 representing the desired mode of operation. Accordingly, in one or more embodiments the user 304 delivers user input 305 to cause one or more processors (110) and/or a mode switcher (132) to change the first mode of operation to a second mode of operation.

In this example, the user input 305 comprises touch input 306 that occurs in the form of a gesture 307. Since the second mode of operation is communicating with a wide area network in accordance with a second communication protocol, which in this example is a 2G communication protocol being used to communicate with a 2G network, the user 304 provides initial touch input 306 at the first user actuation target 102, which represents and identifies this second mode of operation.

Thereafter, the user 304 moves their finger 310 to define a gesture that interacts with the first user actuation target 102 and the second user actuation target 103 multiple times.

Accordingly, the touch sensitive display 101 can detect a plurality of instances where the user input 305 interacts with the first user actuation target 102 and the second user actuation target 103.

In this illustrative example, the gesture 307 comprises a zigzag gesture upon the surface 104 of the touch sensitive display 101 that interacts with each of the first user actuation target 102 and the second user actuation target 103 twice. As shown in FIG. 3, in this illustration the zigzag gesture defines a Z-shape that interacts with the first user actuation target 102 by beginning there and returning after interacting with the second user actuation target 103, and interacts with the second user actuation target 103 after the initial touch input 306 and at the end of the gesture 307.

In one or more embodiments, one or more processors (110) of the electronic device 100 confirm whether this double interaction with both the first user actuation target 102 and the second user actuation target 103 occurs within a predefined time, such as two seconds. Where it does, step 403 comprises changing, switching, or altering the second mode of operation of step 401 back to the first mode of operation. In this illustrative example, the first mode of operation comprises a communication device (112) communicating with a wide area network in accordance with a first communication protocol, which in this example is a 4G communication protocol being used to communicate with a 4G network.

In one or more embodiments, the fact that the mode of operation has changed is identified on the touch sensitive display 101. In one or more embodiments, the right-most user actuation target on the touch sensitive display 101 identifies the active mode of operation. Since the active mode of operation at step 403 is communication using the communication link to the 4G network, second user actuation target 103 is now positioned exterior, i.e., closer to the edge of the electronic device 100, of the first user actuation target 102. Accordingly, the user 304 is alerted to the fact that the first mode of operation occurring at step 403 is communicating with the 4G communication link to the 4G communication network.

Figure 5:
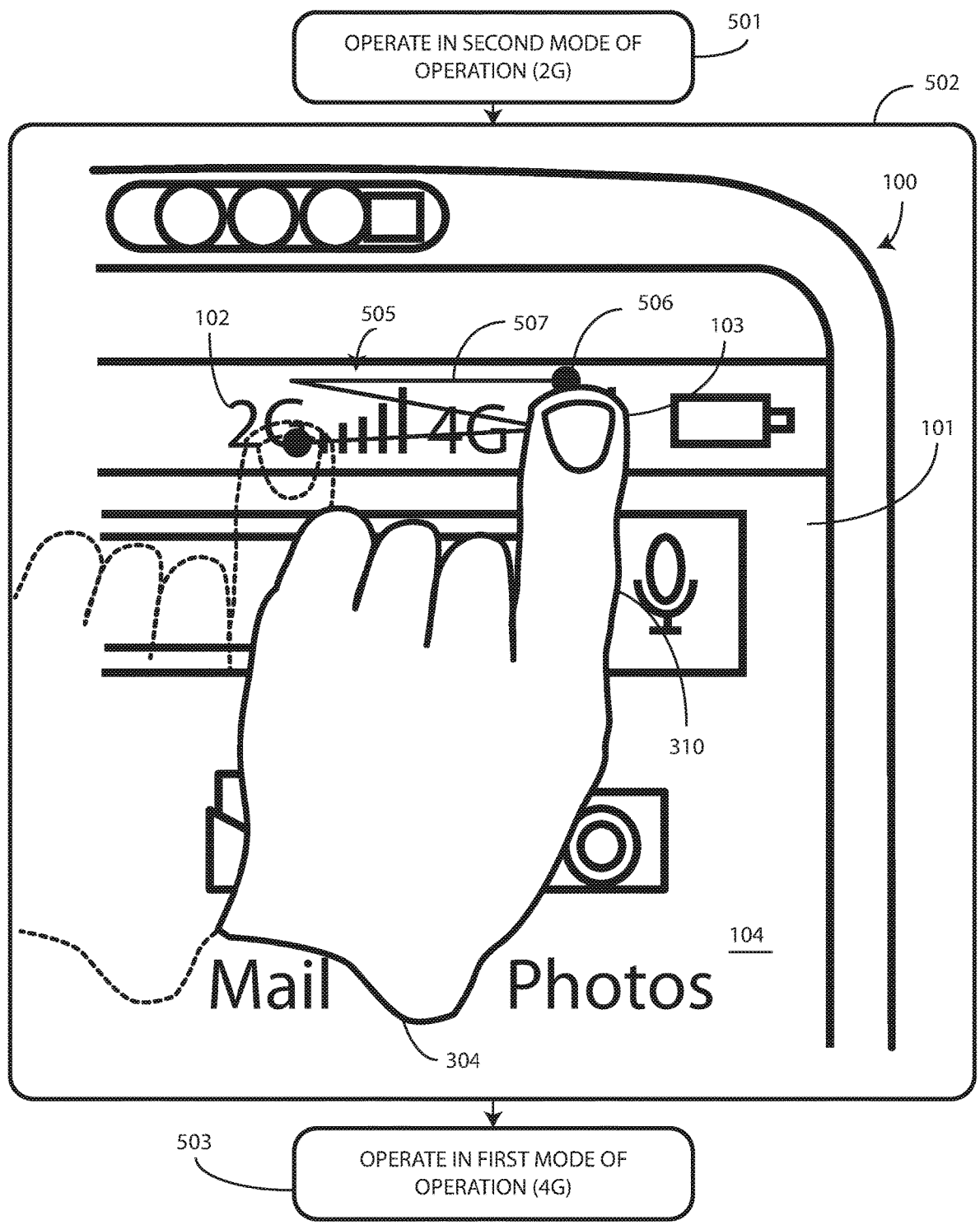
FIG. 5 illustrates one or more explanatory method steps in accordance with one or more embodiments of the disclosure.

It should be noted that this rearrangement of user actuation targets to indicate or identify an active mode of operation is optional. While it occurred in the illustrative embodiment of FIGS. 3-4, in other embodiments it may not. In other embodiments, the active mode of operation may be indicated in other ways. Illustrating by example, a box or circle may be presented around the user actuation target representing the active mode of operation. In still other embodiments, the user actuation target representing the active mode of operation could be presented with darker lines, a different color, in boldfaced type, or with other identifying indicia. Still other techniques for identifying the active mode of operation will be obvious to those of ordinary skill in the art having the benefit of this disclosure.

Where the user actuation targets are not rearranged to identify the active mode of operation, as was the case above with reference to FIGS. 3-4, the user would deliver touch input using a different motion to change modes of operation. Said differently, while in FIGS. 3-4 the user delivered touch input (306) in the form of a gesture (307), by initially delivering touch input (306) at the right-most user actuation target, thereafter moving their finger 310 to create a gesture (307) that interacts with the first user actuation target 102 and the second user actuation target 103 multiple times by making a zigzag gesture defines a Z-shape due to the fact that the right-most user actuation target represented the active mode of operation, if the user actuations targets were statically presented upon the touch sensitive display a different motion may be used in one or more embodiments. Turning now to FIG. 5, illustrated therein is such an embodiment.

The illustrative embodiment of FIG. 5 provides an alternative to this "repeat the same gesture" process. In the illustrative embodiment of FIG. 5, the user initiates the gesture 407 at the user actuation target 102 representing the mode of operation that the user 304 wants changed, and then moves the finger 310 to the user actuation target 103 that the user 304 wants to become active. This is also advantageously intuitive in that one begins at the user actuation target 102 representing the active mode of operation and moves to the user actuation target 103 representing the mode of operation desired to be active.

Thus, in one or more embodiments step 502 comprises the user 304 delivering user input 505 to cause one or more processors (110) and/or a mode switcher (132) to change the second mode of operation back to the first mode of operation. In this example, the user input 505 comprises touch input 506 that occurs in the form of a gesture 507. Since the second mode of operation is communicating with a wide area network in accordance with the second communication protocol, which in this example is a 2G communication protocol being used to communicate with a 2G network, the user 304 provides initial touch input 506 at the user actuation target 102 representing this mode of operation.

Thereafter, the user 304 moves their finger 310 to define a gesture that interacts with the first user actuation target 102 and the second user actuation target 103 multiple times. Accordingly, the touch sensitive display 101 can detect a plurality of instances where the user input 505 interacts with the first user actuation target 102 and the second user actuation target 103. In this illustrative example, the gesture 507 comprises another zigzag gesture upon the surface 104 of the touch sensitive display 101 that interacts with each of the first user actuation target 102 and the second user actuation target 103 twice. As shown in FIG. 5, in this illustration the zigzag gesture is the opposite of that shown in FIGS. 3-4, thereby defining a reverse Z-shape that interacts with the first user actuation target 102 by beginning there and returning after interacting with the second user actuation target 103, and interacts with the second user actuation target 1023 after the initial touch input 406 and at the end of the gesture 407.

In one or more embodiments, one or more processors (110) of the electronic device 100 confirm whether this double interaction with both the first user actuation target 102 and the second user actuation target 103 occurs within a predefined time, such as two seconds. Where it does, step 503 comprises changing, switching, or altering the second mode of operation of step 501 back to the first mode of operation. In this illustrative example, the first mode of operation comprises a communication device (112) communicating with a wide area network in accordance with a first communication protocol, which in this example is a 4G communication protocol being used to communicate with a 4G network.

Thus, step 402 of FIG. 4 illustrates how in one or more embodiments the touch sensitive display 101 can detect, when operating in the second mode of operation, another user input 505 interacting with the first user actuation target 102 and the second user actuation target 103 within the predefined time. In one or more embodiments, when this occurs, optionally within a predefined time, step 503 can comprise changing, with the one or more processors (110), the operating mode of the electronic device 100 from the second mode of operation to the first mode of operation.

While the user input 505 could have comprised another Z-shape, as was the case in step (402) of FIG. 4, in another embodiment illustrated in FIG. 5, the user input (305) of step (302) of FIG. 3 comprised a Z-shaped gesture upon the surface 104 of the touch sensitive display 101, while the other user input 505 of step 502 of FIG. 5 comprises a reverse Z-shaped gesture upon the surface 104 of the touch sensitive display 101. Thus, while they can be the same in one or more embodiments, the gesture (307) from step (302) of FIG. 3 and the gesture 507 from step 502 of FIG. 5 are different.

While Z-shaped gestures are one illustrative gesture that can be used in accordance with one or more embodiments of the disclosure, embodiments are not so limited. As will be described below with reference to FIGS. 9-12, the gesture can take other forms as well. Additionally, gestures other than those shown and described to cause a mode of operation to switch from a first mode of operation to a second mode of operation will be obvious to those of ordinary skill in the art having the benefit of this disclosure as well.

Figure 6:
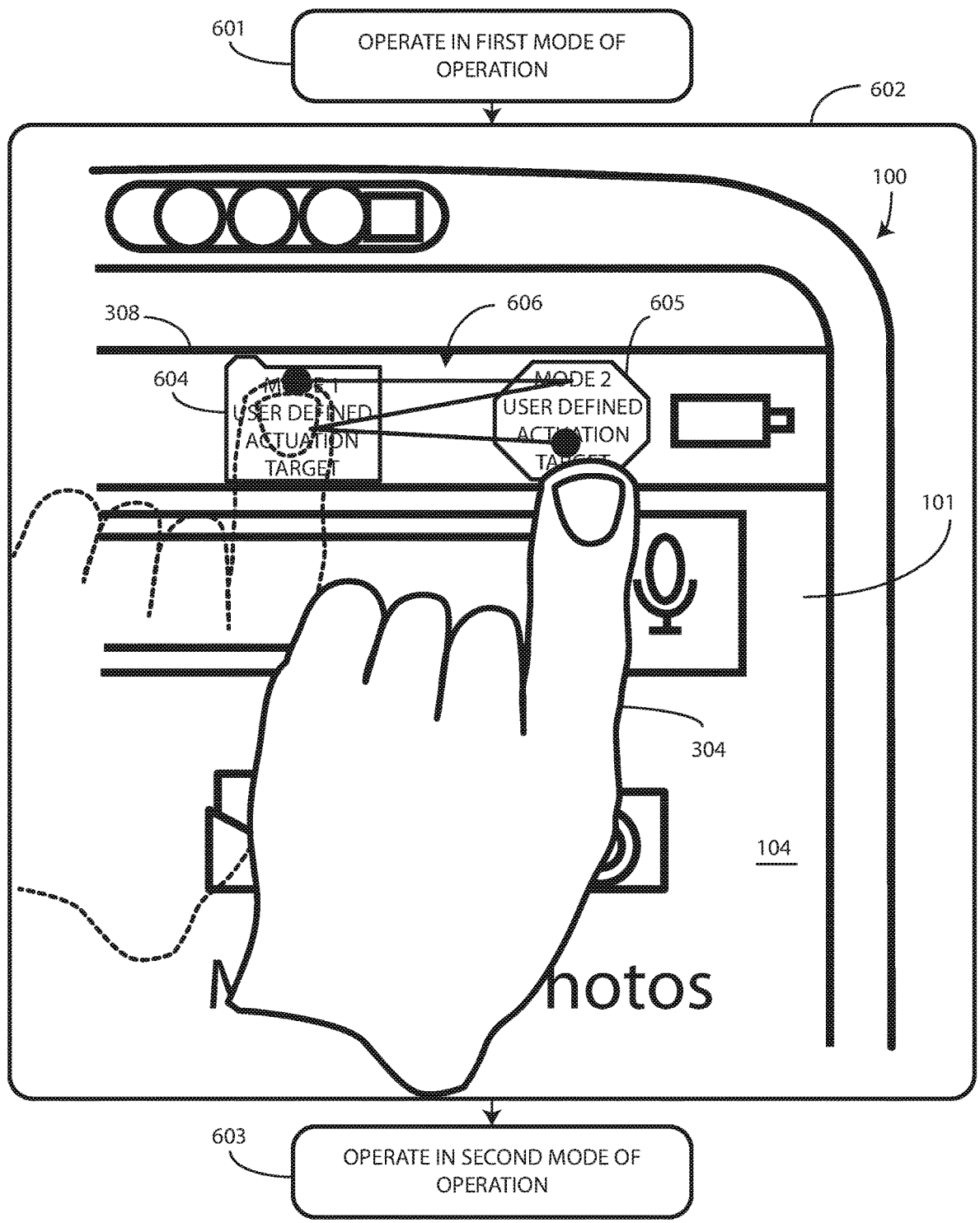
FIG. 6 illustrates one or more explanatory method steps in accordance with one or more embodiments of the disclosure.

Turning now to FIG. 6, illustrated therein are one or more method steps 601,602,603 in accordance with another embodiment of the disclosure. Recall from the discussion of FIG. 8 above that in one or more embodiments the first mode of operation and the second mode of operation can be user defined. In one or more embodiments, just as the first mode of operation and the second mode of operation can be defined, so too can the user actuation targets. FIG. 6 provides method steps 601,602,603 of how this can occur.

Beginning with step 601, an electronic device 100 is operating in a first mode of operation. In this illustrative embodiment, the first mode of operation is user defined, and comprises a social media application operating on the electronic device 100.

At step 602, the touch sensitive display 101 is persistently presenting a first user actuation target 604 and the second user actuation target 605. In this illustrative embodiment, the touch sensitive display 101 is persistently presenting a first user actuation target 604 and the second user actuation target 605 within a status bar 308.

In this illustrative embodiment, each of the first user actuation target 604 and the second user actuation target 605 identifies a corresponding mode of operation. Said differently, the first user actuation target 604 identifies a first user defined mode of operation, while the second user actuation target 605 identifies a second user defined mode of operation. In this illustrative embodiment, each of the first user actuation target 604 and the second user actuation target 605 is user defined, and includes a user defined shape surrounding a user defined identifier indicating with which mode of operation each user actuation target corresponds. This, advantageously, allows the user to instantly recognize the operating mode from its corresponding user actuation target.

At step 602, a user 304 wishes to cause the electronic device 100 to switch from the first mode of operation of step 601 to a second mode of operation. In this illustration, the second mode of operation comprises the electronic device 100 operating as an electronic book reader.

Accordingly, a user 304 delivers touch input 606 to cause one or more processors (110) and/or a mode switcher (132) to change the first mode of operation to a second mode of operation. In this example, the touch input 606 interacts with both the first user actuation target 604 and the second user actuation target 605 a plurality of times within a predefined time period. As with FIGS. 3-5, in this illustrative embodiment the touch input 606 comprises a zigzag gesture upon the surface 104 of the touch sensitive display 101 that interacts with each of the first user actuation target 604 and the second user actuation target 605 twice. In one or more embodiments, when this occurs, step 603 comprises changing, switching, or altering the first mode of operation of step 601 to the second mode of operation as previously described.

Figure 7:
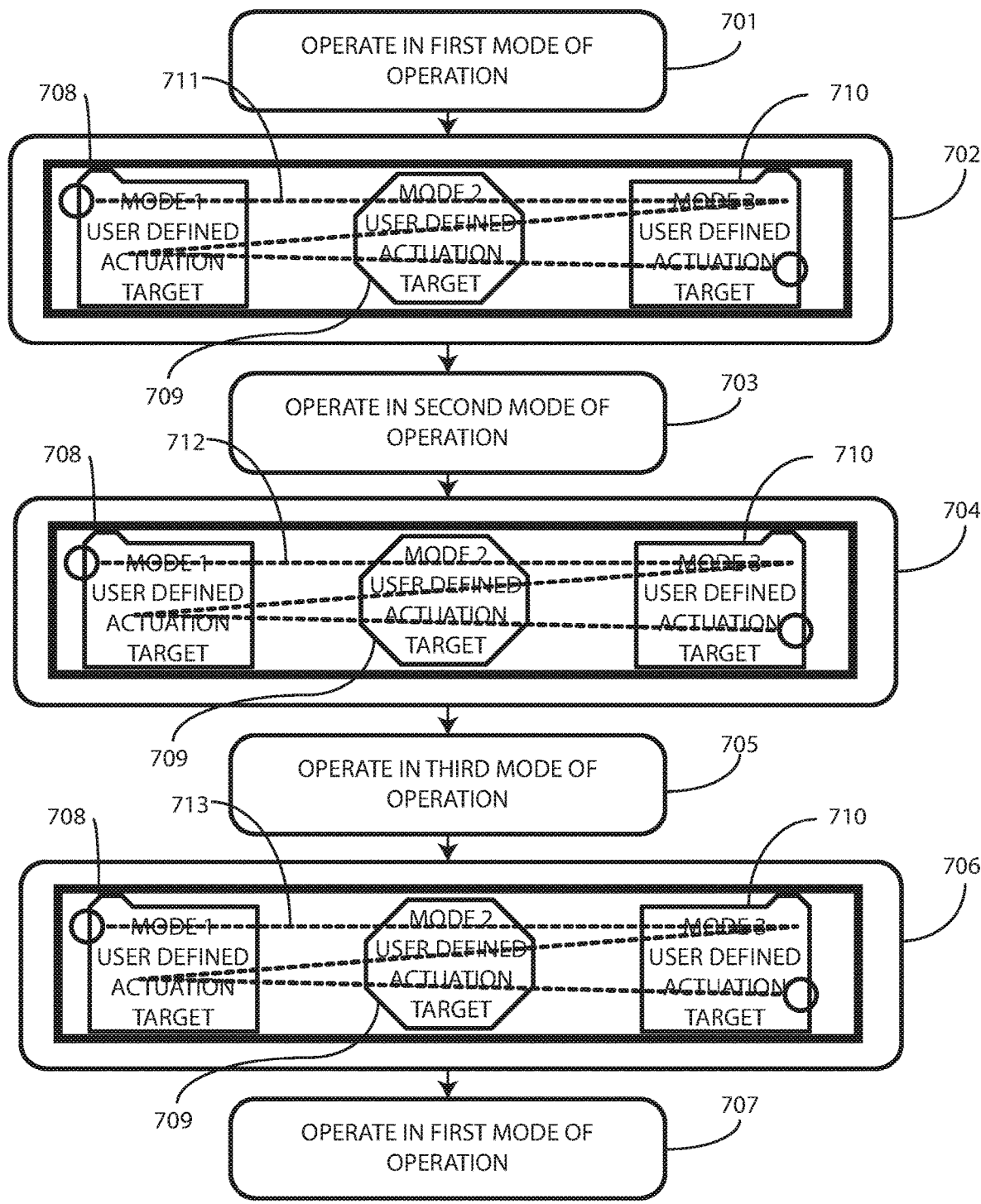
FIG. 7 illustrates one or more explanatory method steps in accordance with one or more embodiments of the disclosure

Turning now to FIG. 7, illustrated therein are one or more method steps 701,702,703,704,705,706,707 illustrating how embodiments of the disclosure can be extended from switching two modes of operation to switching three or more modes of operation. Beginning at step 701, an electronic device is operating in a first mode of operation. The mode of operation can be any of those listed above with reference to FIG. 8. Alternatively, the mode of operation can be another mode of operation that is obvious to those of ordinary skill in the art having the benefit of this disclosure.

At step 702, a touch sensitive display is persistently presenting three user actuation targets, namely, a first user actuation target 708, a second user actuation target 709, and a third user actuation target 710. While three user actuation targets are shown in FIG. 7, it is to be understood that the method described in FIG. 7 can be extended to any number of actuation targets.

At step 702, a user wishes to cause the electronic device to switch from the first mode of operation of step 701 to a second mode of operation. Accordingly, a user delivers user input 711 to cause one or more processors and/or a mode switcher to change the first mode of operation to a second mode of operation. In this example, the user input 711 comprises touch input that interacts with all three user actuation targets. The user input 711 begins at the first user actuation target 708, then moves and interacts with the second user actuation target 709, then interacts with the third user actuation target 710. From there, the user input 711 returns to the second user actuation target 709 and first user actuation target 708, respectively, and then back to interact with the second user actuation target 709 and, finally, the third user actuation target 710. In one or more embodiments, when this occurs, optionally within a predefined time period, step 703 comprises changing, switching, or altering the first mode of operation of step 701 to a second mode of operation.

At step 704, the user wishes to cause the electronic device to switch from the second mode of operation of step 703 to a third mode of operation. In contrast to making a different gesture, as was the case above in FIG. 5, in this embodiment the user delivers another user input 712 interacting with the three user actuation targets that is similar in detail to that delivered at step 702. In one or more embodiments, this causes a switch from the second mode of operation to the third mode of operation.

Accordingly, the user delivers another user input 712 to cause one or more processors and/or a mode switcher to change the second mode of operation to the third mode of operation. In this example, the user input 712 comprises touch input that once again interacts with all three user actuation targets. The user input 712 begins at the first user actuation target 708, then moves and interacts with the second user actuation target 709, then interacts with the third user actuation target 710. From there, the user input 711 returns to the second user actuation target 709 and first user actuation target 708, respectively, and then back to interact with the second user actuation target 709 and, finally, the third user actuation target 710. In one or more embodiments, when this occurs, optionally within a predefined time period, step 705 comprises changing, switching, or altering the second mode of operation of step 703 to the third mode of operation.

The method can then repeat to return the operating mode to the first mode of operation. For example, at step 706 the user delivers another user input 713 to cause one or more processors and/or a mode switcher to change the third mode of operation to the first mode of operation. In this example, the user input 713 comprises touch input that once again interacts with all three user actuation targets. The user input 713 begins at the first user actuation target 708, then moves and interacts with the second user actuation target 709, then interacts with the third user actuation target 710. From there, the user input 711 returns to the second user actuation target 709 and first user actuation target 708, respectively, and then back to interact with the second user actuation target 709 and, finally, the third user actuation target 710. In one or more embodiments, when this occurs, optionally within a predefined time period, step 707 comprises changing, switching, or altering the third mode of operation of step 706 back to the first mode of operation.

Turning now to FIGS. 9-12, illustrated therein are various gestures that interact with user actuation targets to cause operating mode changes in accordance with one or more embodiments of the disclosure. These examples are provided to show additional embodiments beyond the Z-shaped gesture and reverse Z-shaped gesture described above. However, it should be noted that the embodiments of FIGS. 9-12 are illustrative only. Others will be obvious to those of ordinary skill in the art having the benefit of this disclosure.

Figure 9:
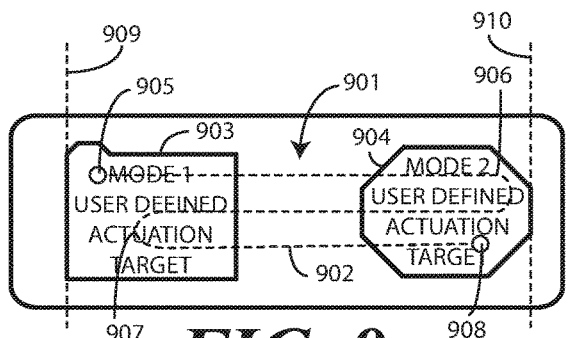
FIG. 9 illustrates one or more explanatory method steps in accordance with one or more embodiments of the disclosure.

Beginning with FIG. 9, in this illustrative embodiment the user input 901 comprises a gesture 902 occurring in a reverse S-shape interacting with a first user actuation target 903 and a second user actuation target 904. In this illustrative embodiment, the beginning 905, first curve 906, second curve 907, and end 908 of the gesture pass over, but do not pass beyond the external boundaries 909,910 of, the first user actuation target 903 and the second user actuation target 904.

Figure 10:
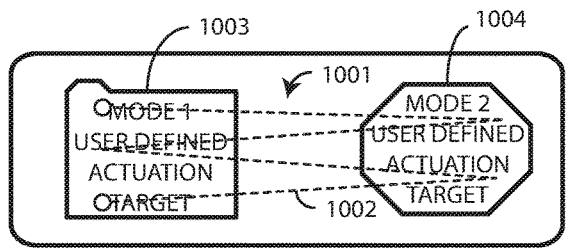
FIG. 10 illustrates one or more explanatory method steps in accordance with one or more embodiments of the disclosure.

Turning now FIG. 10, in this illustrative embodiment the user input 1001 comprises a gesture 1002 occurring in sideways W-shape (which could alternatively be converted to a sideways M-shape) interacting with a first user actuation target 1003 and a second user actuation target 1004. By using a sideways W or sideways M, one user interaction target will be interacted with more than the other. In this illustration, the first user actuation target 1003 is interacted with three times, while the second user actuation target 1004 is only interacted with twice. Using an asymmetrical interaction such as this can allow a user to indicate which operating mode it desires by interacting with that user interaction target more, or less, than the other.

Figure 11:
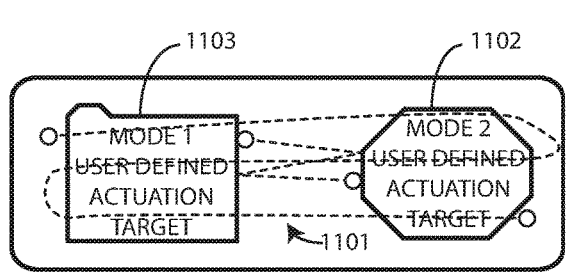
FIG. 11 illustrates one or more explanatory method steps in accordance with one or more embodiments of the disclosure.

Turning now to FIG. 11, here the user input 1101 comprises a free-form gesture 1102 that interacts with each user actuation target 1103,1104 more than twice. Moreover, as can be seen from the start, curves, and end, in this illustration the free-form gesture 1102 interacts with user actuation target 1103,1104 by interacting with the interior boundaries of each user actuation target 1103,1104, the interior of each user actuation target 1103,1104, and even passing over the exterior boundaries of each user actuation target 1103,1104.

Figure 12:
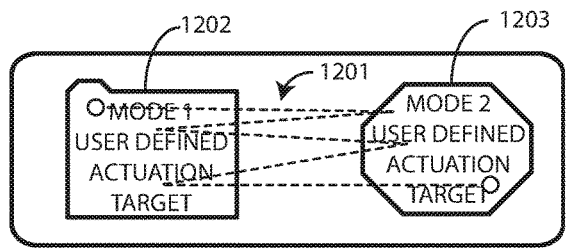
FIG. 12 illustrates one or more explanatory method steps in accordance with one or more embodiments of the disclosure.

Turning now to FIG. 12, this illustrates a user input 1201 that interacts with a first user actuation target 1202 and a second user actuation target 1203 a plurality of times. In this illustration, the plurality of times is more than two, as it is three. While three interactions are shown, the number of interactions required to cause an electronic device to switch its operating mode could be four, five, six, or more interactions, depending upon desired robustness.

It should be noted that the various user interactions of FIGS. 9-12 can be used in combination. For example, a user interaction that interacts with one user actuation target more than another (FIG. 10), but that cannot pass beyond the outer boundaries of each user actuation target (FIG. 9), yet that can occur in a free-form manner (FIG. 11) to cause an electronic device to change its mode of operation could be allowed in at least one embodiment. Other combinations of portions of these figures to define a unique user input requirement set will be obvious to those of ordinary skill in the art having the benefit of this disclosure.

Figure 13:
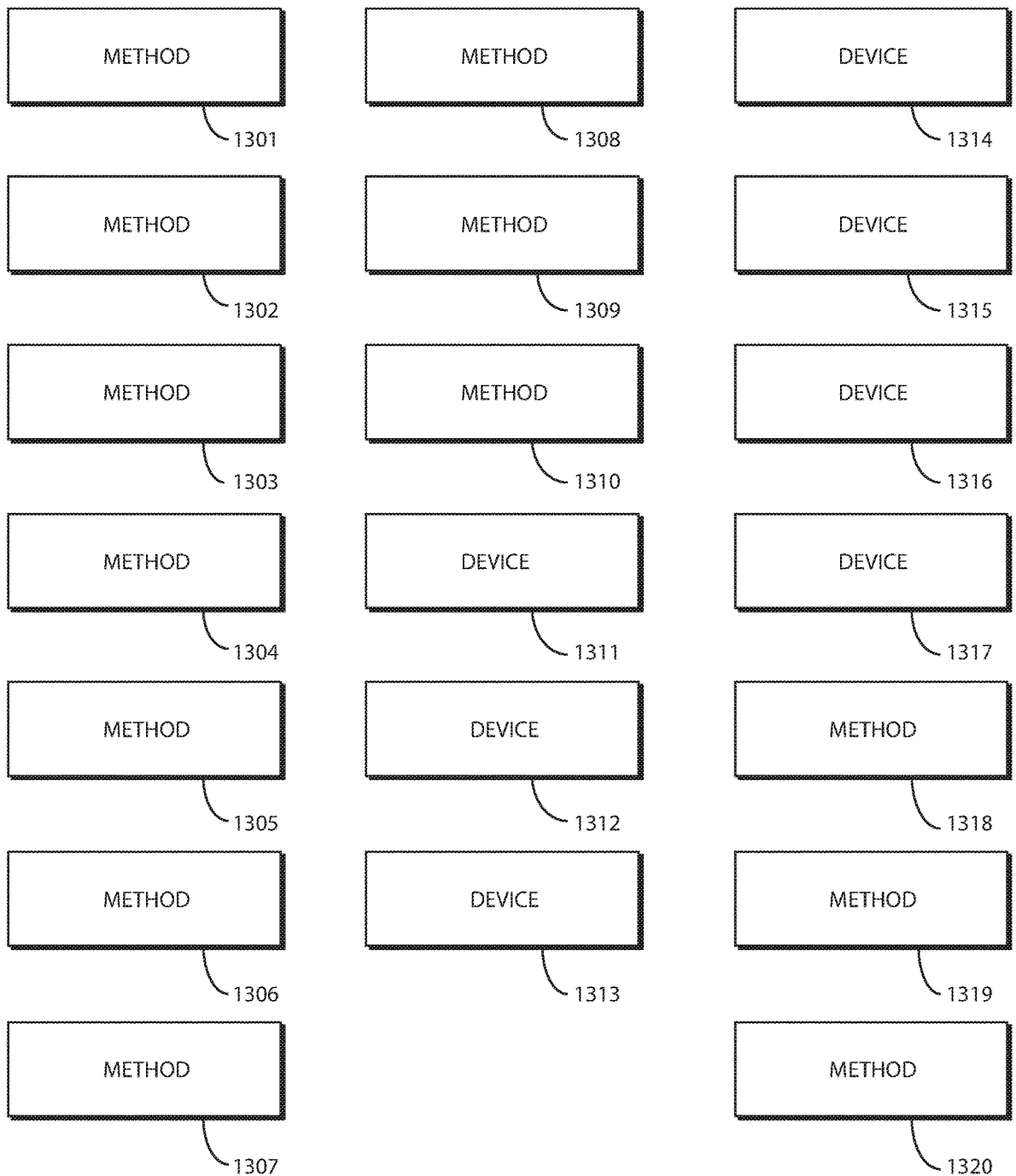
FIG. 13 illustrates various embodiments of the disclosure.

Turning now to FIG. 13, illustrated therein are various embodiments of the disclosure. At 1301, a method in an electronic device comprises detecting, with a touch sensitive display, user input interacting with a first user actuation target and a second user actuation target within a predefined time. At 1301, the method comprises, upon detecting the user input interacting with the first user actuation target and the second user actuation target within the predefined time, changing, with one or more processors operable with the touch sensitive display, an operating mode of the electronic device from a first mode of operation to a second mode of operation. At 1302, the first user actuation target of 1301 identifies the first mode of operation, while the second user actuation target identifies the second mode of operation.

At 1303, the method of 1302 further comprises persistently presenting, with the touch sensitive display, both the first user actuation target and the second user actuation target when operating in the first mode of operation. At 1304, the method of 1303 further comprises also persistently presenting, with the touch sensitive display, both the first user actuation target and the second user actuation target when operating in the second mode of operation.

At 1305, the detecting of 1301 comprises detecting a plurality of instances of the user input interacting with the first user actuation target and the second user actuation target a plurality within the predefined time. At 1306, the user input of 1305 comprises a zigzag gesture upon a surface of the touch sensitive display. At 1307, the zigzag gesture of 1306 interacts with each of the first user actuation target and the second user actuation target twice. At 1308, the zigzag gesture of 1306 defines one of a Z-shape or a reverse Z-shape.

At 1309, the method of 1301 further comprises detecting, with the touch sensitive display, when operating in the second mode of operation, another user input interacting with the first user actuation target and the second user actuation target within the predefined time. At 1309, and upon detecting the another user input interacting with the first user actuation target and the second user actuation target within the predefined time, the method comprises changing, with the one or more processors, the operating mode of the electronic device from the second mode of operation to the first mode of operation. At 1310, the user input of 1309 comprises a Z-shaped gesture upon a surface of the touch sensitive display, while the another user input comprises a reverse Z-shaped gesture upon the surface of the touch sensitive display.

At 1311, an electronic device comprises a touch sensitive display. At 1311, the electronic device comprises one or more processors operable with the touch sensitive display. At 1311, the touch sensitive display presents a first user actuation target and a second user actuation target. At 1311, the touch sensitive display detects touch input at the first user actuation target and the second user actuation target within a predefined time. At 1311, the one or more processors switch, in response to the touch input, the electronic device from a first mode of operation to a second mode of operation.

At 1312, the electronic device of 1311 further comprises a communication device. AT 1312, the first mode of operation comprises the communication device operating in accordance with a first data communication protocol, while the second mode of operation comprising the communication device operating in accordance with a second data communication protocol. At 1313, the first user actuation target and the second user actuation target of 1311 each comprise user defined user actuation targets.

At 1314, the touch sensitive display of 1311 detects another touch input at the first user actuation target and the second user actuation target within the predefined time. At 1314, the one or more processors switch, in response to the another touch input, the electronic device from the second mode of operation to the first mode of operation. At 1315, the touch input of 1314 defines a Z-shaped gesture along the touch sensitive display, while the another touch input comprises one of the Z-shaped gesture or a reverse Z-shaped gesture along the touch sensitive display.

At 1316, the touch input of 1314 interacts with the first user actuation target more times than the second user actuation target. At 1317, the touch sensitive display of 1311 persistently presents the first user actuation target and the second user actuation target within a status bar along with other user actuation targets.

At 1318, a method in an electronic device comprises detecting, with a touch sensitive surface, a user gesture passing a plurality of times over a first user actuation target and a second user actuation target. At 1318, each persistently user actuation target is presented on the touch sensitive surface. At 1318, the method comprises, in response to detecting the user gesture, altering a mode of operation of the electronic device from a first mode of operation to a second mode of operation.

At 1319, the method of 1318 detects, with the touch sensitive surface, another user gesture passing another plurality of times over the first user actuation target and the second user actuation target. At 1319, in response to detecting the another user gesture, the method comprises altering the mode of operation of the electronic device from the second mode of operation to the first mode of operation. At 1320, the user gesture and the other user gesture of 1319 are different.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in an electronic device, the method comprising:
   detecting, with a touch sensitive display, a plurality of instances of user input interacting with a first user actuation target and a second user actuation target within a predefined time; and
   upon detecting the user input interacting with the first user actuation target and the second user actuation target within the predefined time, changing, with one or more processors operable with the touch sensitive display, an operating mode of the electronic device from a first mode of operation to a second mode of operation.

2. The method of claim 1, the first user actuation target identifying the first mode of operation, the second user actuation target identifying the second mode of operation.

3. The method of claim 2, further comprising persistently presenting, with the touch sensitive display, both the first user actuation target and the second user actuation target when operating in the first mode of operation.

4. The method of claim 3, further comprising also persistently presenting, with the touch sensitive display, both the first user actuation target and the second user actuation target when operating in the second mode of operation.

5. The method of claim 1, the first user actuation target indicative of a first communication network and the second user actuation target indicative of a second communication network.

6. The method of claim 1, the user input comprising a zigzag gesture upon a surface of the touch sensitive display.

7. The method of claim 6, wherein the zigzag gesture interacts with each of the first user actuation target and the second user actuation target twice.

8. The method of claim 6, wherein the zigzag gesture defines one of a Z-shape or a reverse Z-shape.

9. The method of claim 1, further comprising:
   detecting, with the touch sensitive display when operating in the second mode of operation, another user input interacting with the first user actuation target and the second user actuation target within the predefined time; and
   upon detecting the another user input interacting with the first user actuation target and the second user actuation target within the predefined time, changing, with the one or more processors, the operating mode of the electronic device from the second mode of operation to the first mode of operation.

10. The method of claim 9, the user input comprising a Z-shaped gesture upon a surface of the touch sensitive display, the another user input comprising a reverse Z-shaped gesture upon the surface of the touch sensitive display.

11. An electronic device, comprising:
    a touch sensitive display; and
    one or more processors operable with the touch sensitive display;
    the touch sensitive display presenting a first user actuation target and a second user actuation target and detecting touch input interacting multiple times with the first user actuation target and the second user actuation target within a predefined time; and
    the one or more processors switching, in response to the touch input, the electronic device from a first mode of operation to a second mode of operation.

12. The electronic device of claim 11, further comprising a communication device, the first mode of operation comprising the communication device operating in accordance with a first data communication protocol, the second mode of operation comprising the communication device operating in accordance with a second data communication protocol.

13. The electronic device of claim 11, the first user actuation target and the second user actuation target each comprising user defined user actuation targets.

14. The electronic device of claim 11, the touch sensitive display detecting another touch input at the first user actuation target and the second user actuation target within the predefined time, the one or more processors switching, in response to the another touch input, the electronic device from the second mode of operation to the first mode of operation.

15. The electronic device of claim 14, the touch input defining a Z-shaped gesture along the touch sensitive display, the another touch input comprising one of the Z-shaped gesture or a reverse Z-shaped gesture along the touch sensitive display.

16. The electronic device of claim 14, the touch input interacting with the first user actuation target more times than the second user actuation target.

17. The electronic device of claim 11, the touch sensitive display persistently presenting the first user actuation target and the second user actuation target within a status bar along with other user actuation targets.

18. A method in an electronic device, the method comprising:
detecting, with a touch sensitive surface, a user gesture passing a plurality of times over a first user actuation target and a second user actuation target within the predefined time, each persistently presented on the touch sensitive surface; and
in response to detecting the user gesture, altering a mode of operation of the electronic device from a first mode of operation to a second mode of operation.

19. The method of claim 18, further comprising:
detecting, with the touch sensitive surface, another user gesture passing another plurality of times over the first user actuation target and the second user actuation target; and
in response to detecting the another user gesture, altering the mode of operation of the electronic device from the second mode of operation to the first mode of operation.

20. The method of claim 19, wherein the user gesture and the another user gesture are different.

* * * * *